(12) United States Patent
Pedersen et al.

(10) Patent No.: US 10,839,473 B2
(45) Date of Patent: Nov. 17, 2020

(54) AUTONOMOUS VEHICLE MONITORING USING GENERATED INTERFACES

(71) Applicants: Nissan North America, Inc., Franklin, TN (US); Florida Institute for Human & Machine Cognition, Inc., Pensacola, FL (US)

(72) Inventors: Liam Pedersen, San Francisco, CA (US); Maarten Sierhuis, San Francisco, CA (US); Hans Utz, Campbell, CA (US); Mauro Della Penna, San Francisco, CA (US); Jeffrey Bradshaw, Nampa, ID (US); Matthew Johnson, Pensacola, FL (US); Michael Vignati, Pensacola, FL (US); Lawrence Bunch, Pensacola, FL (US)

(73) Assignees: Nissan North America, Inc., Franklin, TN (US); Florida Institute for Human & Machine Cognition, Inc., Pensacola, FL (US)

( * ) Notice: Subject to any disclaimer, the term of this patent is extended or adjusted under 35 U.S.C. 154(b) by 10 days.

(21) Appl. No.: 16/349,486

(22) PCT Filed: Nov. 30, 2017

(86) PCT No.: PCT/US2017/063815
§ 371 (c)(1),
(2) Date: May 13, 2019

(87) PCT Pub. No.: WO2018/102474
PCT Pub. Date: Jun. 7, 2018

(65) Prior Publication Data
US 2020/0193549 A1    Jun. 18, 2020

Related U.S. Application Data

(60) Provisional application No. 62/428,082, filed on Nov. 30, 2016.

(51) Int. Cl.
*G06Q 50/30* (2012.01)
*G05D 1/00* (2006.01)
(Continued)

(52) U.S. Cl.
CPC .......... *G06Q 50/30* (2013.01); *G05D 1/0088* (2013.01); *G06Q 10/047* (2013.01);
(Continued)

(58) Field of Classification Search
CPC .... G06Q 50/30; G06Q 10/017; G06Q 10/063; G06Q 10/20; G05D 1/0088;
(Continued)

(56) References Cited

U.S. PATENT DOCUMENTS

2006/0136291 A1  6/2006  Morita et al.
2011/0130916 A1  6/2011  Mayer
2015/0228188 A1  8/2015  Macfarlane et al.

FOREIGN PATENT DOCUMENTS

JP    H0922497 A    1/1997
JP    2000057476 A  2/2000
(Continued)

OTHER PUBLICATIONS

Extended European Search Report of corresponding application EP 17875348.9; dated Nov. 14, 2019; 11 pages.
(Continued)

*Primary Examiner* — Anne Marie Antonucci
(74) *Attorney, Agent, or Firm* — Young Basile Hanlon & MacFarlane, P.C.

(57) ABSTRACT

Methods, apparatuses, systems, and non-transitory computer readable storage media for monitoring vehicles including autonomous vehicles are described. The disclosed technology includes a vehicle monitoring system that receives vehicle data and external data associated with a vehicle and a corresponding predetermined area. The vehicle data
(Continued)

includes a vehicle state of the vehicle and the external data includes external states of external objects. An issue type of the vehicle is determined based on the vehicle state and at least one of the external states. An indication of the issue type is generated for display on an interface.

20 Claims, 14 Drawing Sheets

(51) Int. Cl.

| | | |
|---|---|---|
| *G07C 5/08* | (2006.01) | |
| *G08G 1/01* | (2006.01) | |
| *G08G 1/052* | (2006.01) | |
| *G06Q 10/06* | (2012.01) | |
| *G06Q 10/04* | (2012.01) | |
| *G06Q 10/00* | (2012.01) | |
| *G07C 5/00* | (2006.01) | |
| *G06N 20/00* | (2019.01) | |

(52) U.S. Cl.
CPC ........... *G06Q 10/063* (2013.01); *G06Q 10/20* (2013.01); *G07C 5/008* (2013.01); *G07C 5/0825* (2013.01); *G08G 1/0112* (2013.01); *G08G 1/052* (2013.01); *G06N 20/00* (2019.01)

(58) Field of Classification Search
CPC .. G05D 1/0274; G05D 1/0255; G05D 1/0246; G05D 1/0272; G05D 1/027; G05D 1/0278; G05D 2201/0216; G07C 5/008; G07C 5/0825; G08G 1/0112; G08G 1/052; G08G 1/20; G06N 20/00; G06N 3/008; G05B 19/425; G05B 19/427; G05B 2219/36159; B25J 9/1671; A61B 19/22
See application file for complete search history.

(56) References Cited

FOREIGN PATENT DOCUMENTS

| JP | 2008210375 A | 9/2008 |
|---|---|---|
| JP | 2009251968 A | 10/2009 |
| JP | 2012168992 A | 9/2012 |
| JP | 2013109746 A | 6/2013 |

OTHER PUBLICATIONS

Gupta et al., DTC: A Framework to Detect Traffic Congestion by Mining Versatile GPS Data; 2013 1st International Conference on Emerging Trends and Applications in Computer Science, IEEE, Sep. 13, 2013 (Sep. 13, 2013), pp. 97-103.

Tan-Hsu Tan et al., Development of an Emergency Medical Service System Based on Wireless Networks and Real-Time Traffic Information; 2012 International Conference on Computerized Healthcare (ICCH), IEEE, Dec. 17, 2012 (Dec. 17, 2012), pp. 35-42.

AUTONOMOUS VEHICLE MONITORING USING GENERATED INTERFACES

CROSS-REFERENCE TO RELATED APPLICATION(S)

This application claims priority to and the benefit of U.S. Provisional Application Ser. No. 62/428,082, filed Nov. 30, 2016, the entire disclosure of which is hereby incorporated by reference.

TECHNICAL FIELD

This application relates to vehicle monitoring, including methods, apparatuses, systems, and non-transitory computer readable media for generating interfaces to monitor vehicles, including autonomous vehicles.

BACKGROUND

The proliferation of autonomous vehicles is fueled in part by the idea that the movement of vehicles through a transportation network can be made more efficient and safe by reducing the number of human drivers, and accordingly reducing the number of errors caused by those drivers. However, replacing drivers with autonomous vehicles can result in various issues due to potential peculiarities in the way an autonomous vehicle interacts with an unpredictable environment.

SUMMARY

Disclosed herein are aspects, features, elements, implementations, and implementations to monitor vehicles in a transportation network.

In an implementation, a method for vehicle monitoring is provided. The method comprises receiving vehicle data and external data associated with a vehicle and a predetermined area, wherein the vehicle data includes a vehicle state of the vehicle and the external data includes external states of external objects. The method includes determining an issue type of the vehicle based on the vehicle state and at least one of the external states and generating an indication of the issue type for display on an interface.

In an implementation, a vehicle monitoring apparatus is provided. The vehicle monitoring apparatus comprises a non-transitory memory and a processor. The processor is configured to execute instructions stored in the non-transitory memory to receive vehicle data and external data associated with a vehicle and a corresponding predetermined area, wherein the vehicle data includes a vehicle state of the vehicle and the external data includes external states of external objects. The vehicle monitoring apparatus can determine an issue type of the vehicle based on the vehicle state and at least one of the external states and can generate an indication of the issue type for display on an interface.

In an implementation, a non-transitory computer-readable storage medium is provided. The non-transitory computer-readable storage medium includes program instructions executable by one or more processors that, when executed, cause the one or more processors to perform operations. The operations comprise receiving vehicle data and external data associated with a vehicle and a corresponding predetermined area, wherein the vehicle data includes a vehicle state of the vehicle and the external data includes external states of external objects. The operations include determining an issue type of the vehicle based on the vehicle state and at least one of the external states and generating an indication of the issue type for display on an interface.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
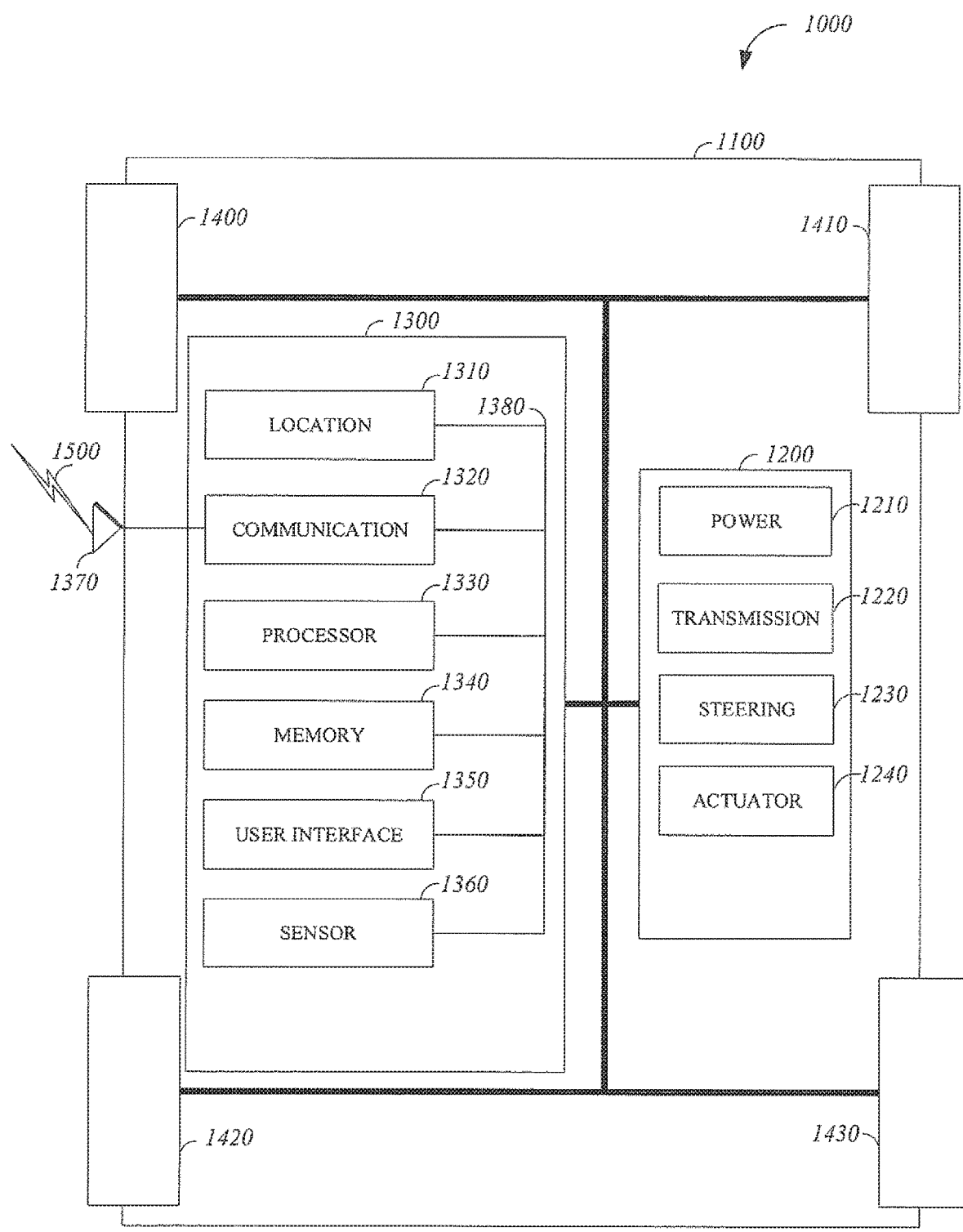
FIG. 1 is a diagram of an example of a portion of a vehicle in which the aspects, features and elements disclosed herein may be implemented.

In a transportation network that comprises large numbers of vehicles monitored by operators (including but not limited to human and machine operators), the ability to detect and resolve issues is often constrained by the ability of the monitoring system to provide useful data to the operator. Due to the large number of vehicles being monitored, and the vast amount of data that can be associated with those vehicles, the operator can experience information overload when the data is provided without adequate filtering and in a form that is not readily comprehensible and is not generated using streamlined visuals. Existing ways of monitoring vehicles are often labor intensive and do not display the state of vehicles and the surrounding environment in a way that is readily intelligible and accessible to generate suggestions at a glance.

Accordingly, there is an unmet demand for a more effective way to monitor the state of vehicles in a vehicle transportation network. As such, it would be advantageous to have a way to quickly assess the state of each of the vehicles, without having to perform complex interactions with a user interface. In the disclosed technology, monitoring the state of vehicles is facilitated by generating multiple interfaces (including but not limited to fleet manager and vehicle manager interfaces) that transform vehicle data and external or environmental data (including but not limited to external objects, road obstacles, other vehicles, pedestrians, traffic data, weather data, etc.) into easy to understand indicators (e.g., generated visual indicator glyphs) based on the respective state of the vehicles and the external objects. The disclosed technology also enables operators to provide remote support and assistance directly to the vehicles being monitored using the information generated and aggregated via the interfaces. In this way, raw data is generated and transformed into easy to read indications that offers operators, such as remote monitoring personnel, a comprehensive picture of the state of vehicles in the transportation network.

For example, there are often circumstances, such as vehicular failure or the temporary routing of traffic against established traffic patterns, that an autonomous vehicle may not be able to manage in an effective manner. In such circumstances, the present disclosure provides an oversight mechanism (e.g., human or system monitoring of the state of the autonomous vehicles and the environments/infrastructure of their surroundings) that receives and transforms data to enable remote support (including but not limited to rerouting, other types of navigational suggestions) instructions to be transmitted from the monitoring system to the vehicle being supported. This can optimize the flow of the autonomous vehicles through a transportation network. Further, the remote support can be provided in response to a request for support or automatically generated and provided based on data analytics.

The monitoring of the indications via the interfaces can either be done by human operators (e.g., a fleet manager overseeing all of the vehicles that are assigned to separate vehicle managers that are responsible for monitoring the vehicles they have been assigned) or by the system itself using machine learning techniques and data analytics. For example, after processing complex raw data and signals received from various sources (e.g., status information of the vehicle, images from the surrounding environment, overall traffic data of the region, etc.) and generating the indicators that are outputted or displayed onto the interfaces, the system can utilize historical data of the interfaces, previously transmitted instructions and suggestions, and optimized processes to balance the monitoring assignments between the vehicle managers and provide recommendations for issue resolutions that could be provided to the vehicles.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Implementations of this disclosure provide technological improvements to computer networks and autonomous vehicle management, for example, those concerning the extension of computer network components to aggregate complex information regarding the vehicle and its surroundings to generate monitoring interfaces that enable remote monitoring, support, and tele-operation of autonomous vehicles. The development of new ways to monitor autonomous vehicle network resources to, for example, identify system or vehicle impairments and indicate requiring management or attention and communicating instructions or information between the monitoring devices and the vehicles is fundamentally related to autonomous vehicle related computer networks.

Implementations of this disclosure provide at least a system and method for the monitoring of a plurality of vehicles (such as autonomous vehicles). Vehicle data and external data associated with a vehicle and a corresponding predetermined area around or associated with the vehicle are received by a system that includes, for example, a processor and a memory that includes executable instructions. The vehicle data can include a vehicle state of the vehicle (e.g., running low on fuel, running behind on a delivery of a package) and the external data can include external states of a plurality of external objects and data of the external environment. The external objects are external to the vehicle and can include infrastructures such as buildings, road obstructions or obstacles such as a fallen tree and the external environment data can include weather reports, real-time traffic reports, sporting event schedules, etc. An issue type of the vehicle is determined by the system based on the received data including but not limited to the vehicle state and at least one of the external states.

For example, if the vehicle is running low on fuel (vehicle state) and the traffic is congested (external state), then the issue type determined could be a fuel issue and the system could then navigate the vehicle to the nearest gas station based on knowing that the vehicle could not reach the current task's destination. After the issue type is determined, an indication of the issue type can be generated by the system for display on an interface such as a mobile device or computing device. The indication of the issue type can enable an operator monitoring the system and the vehicle being monitored to then either provide instruction data to the vehicle that can be accepted or rejected or automatically change the autonomous operation of the vehicle.

U.S. patent application Ser. No. 15/463,242, filed on Mar. 20, 2017, entitled "OBJECT MANAGEMENT DISPLAY," is incorporated herein by reference in its entirety.

To describe some implementations in greater detail, reference is made to the following figures.

FIG. 1 is a diagram of an example of a vehicle 1000 in which the aspects, features, and elements disclosed herein may be implemented. The vehicle 1000 includes a chassis 1100, a powertrain 1200, a controller 1300, wheels 1400/1410/1420/1430, or any other element or combination of elements of a vehicle. Although the vehicle 1000 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1000, which can include accelerating, decelerating, steering, or otherwise controlling the vehicle 1000.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1000 from a remote location including the operations center. The instructions for remote operation may be stored in the vehicle 1000 or received from an external source such as a traffic management center, or server computing devices, which may include cloud based server computing devices.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensor 1360 may include sensors that are operable to obtain information regarding the physical environment surrounding the vehicle 1000. For example, one or more sensors detect road geometry and obstacles, such as fixed obstacles, vehicles, cyclists, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1000 may include a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
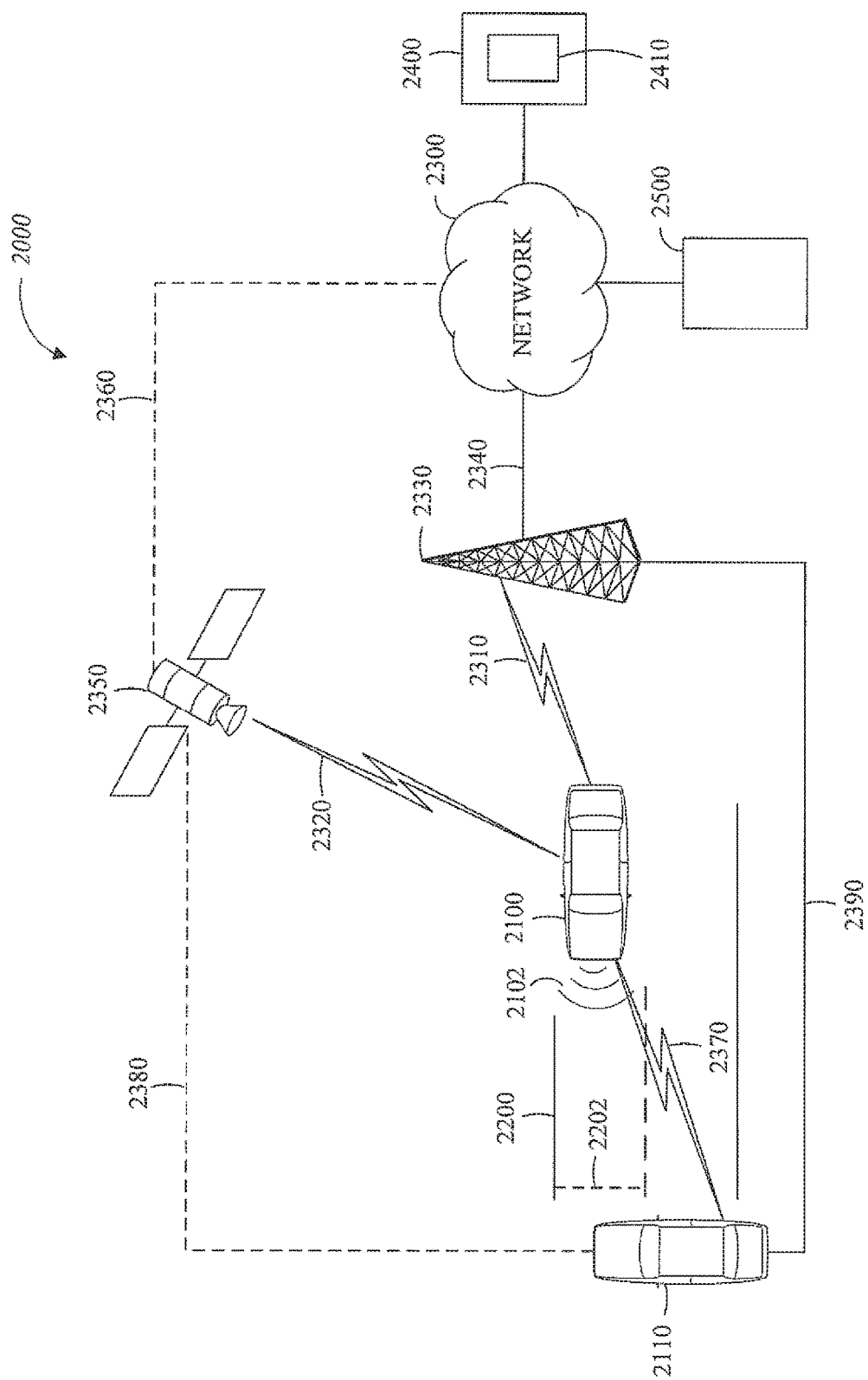
FIG. 2 is a diagram of an example of a portion of a vehicle transportation and communication system in which the aspects, features and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1000 shown in FIG. 1, and one or more external objects, such as an external object 2110, which can include any form of transportation, such as the vehicle 1000 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

Figure 3:
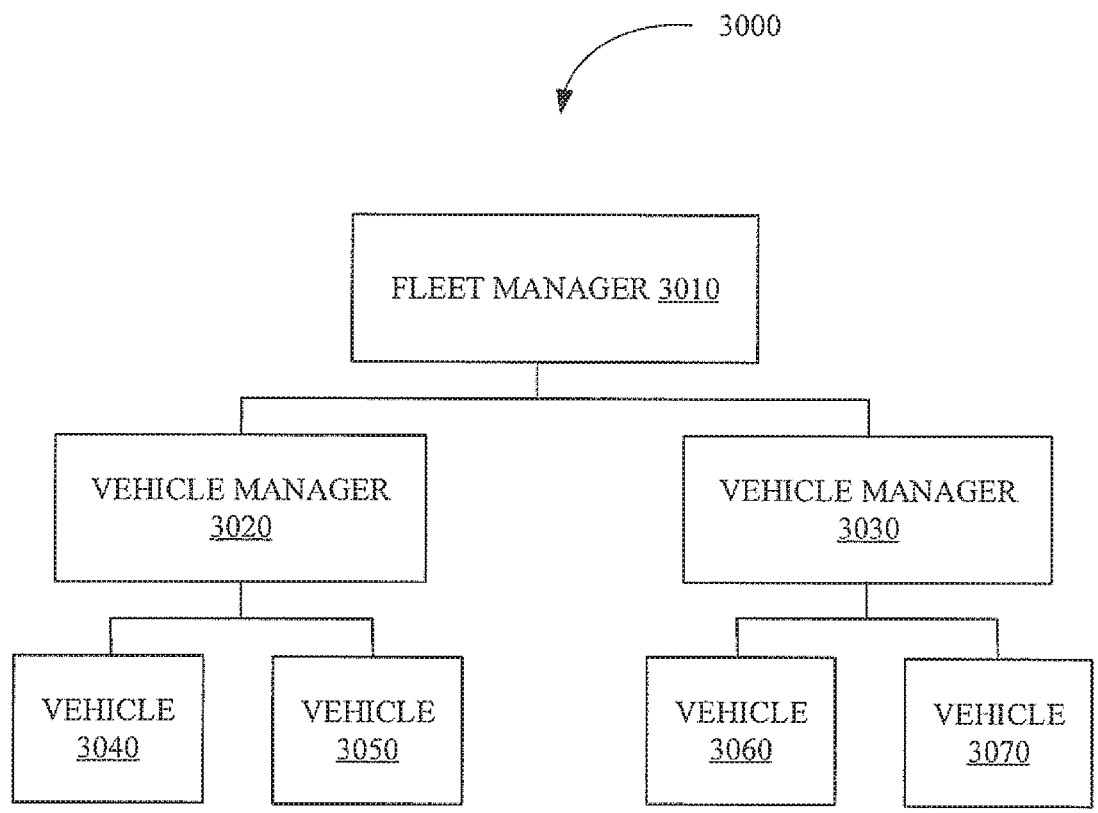
FIG. 3 is a block diagram illustrating a remote vehicle assistance center in accordance with the present disclosure.

FIG. 3 is a block diagram illustrating a remote vehicle assistance center 3000 according to this disclosure. The remote vehicle assistance center 3000 includes a fleet manager 3010, a plurality of vehicle managers including but not limited to a vehicle manager 3020 and a vehicle manager 3030, and a plurality of vehicles including but not limited to vehicles 3040, 3050, 3060, and 3070.

The fleet manager 3010 can include an apparatus including some or all of the features of the controller 1300 shown in FIG. 1. The fleet manager 3010 can monitor and coordinate vehicle managers, including the vehicle managers 3020/3030 as well as the movement of vehicles, including autonomous vehicles, and the vehicles 3040/3050/3060/3070. Monitoring and coordinating the vehicle managers can include any of: assigning, allocating, or deallocating, vehicles to the vehicle managers; reviewing and monitoring performance data of the vehicle managers; and assigning vehicle managers to a geographic area. In an implementation, there can be multiple fleet managers, who may in turn be managed or under the authority of other fleet managers.

The vehicle manager 3020 can monitor the state or condition of vehicles, including the vehicle 3040 and the vehicle 3050. As illustrated in FIG. 3, the vehicle manager 3020 has been assigned vehicle 3040 and vehicle 3050. The assignment of vehicles to a vehicle manager can be performed by a fleet manager such as the fleet manager 3010.

The vehicle manager 3030 can monitor the state or condition of vehicles, including the vehicle 3060 and the vehicle 3070. As illustrated in FIG. 3, the vehicle manager 3030 has been assigned vehicle 3060 and vehicle 3070. The assignment of vehicles to a vehicle manager can be performed by a fleet manager such as the fleet manager 3010. The assignment of vehicles to a vehicle manager can also be automated using machine learning techniques.

In an implementation, the vehicle managers can cluster or group the vehicles, establish communication with occupants in the vehicle, remotely operate the vehicles, and coordinate the movement of the vehicles through a transportation network or around various obstacles such as traffic congestion. The vehicle managers can interact with other vehicle managers to aid in the monitoring and management of the vehicles.

The vehicles including the vehicle 3040/3050/3060/3070 comprise vehicles such as the vehicle 2100 as shown in FIG. 2, that are being monitored or coordinated by the fleet manager 3010. The vehicles can be operated autonomously or by a human driver and can exchange (send and receive) vehicle data relating to the state or condition of the vehicle and its surroundings including any of: vehicle velocity; vehicle location; vehicle operational state; vehicle destination; vehicle route; vehicle sensor data; external object velocity; and external object location.

Figure 4:
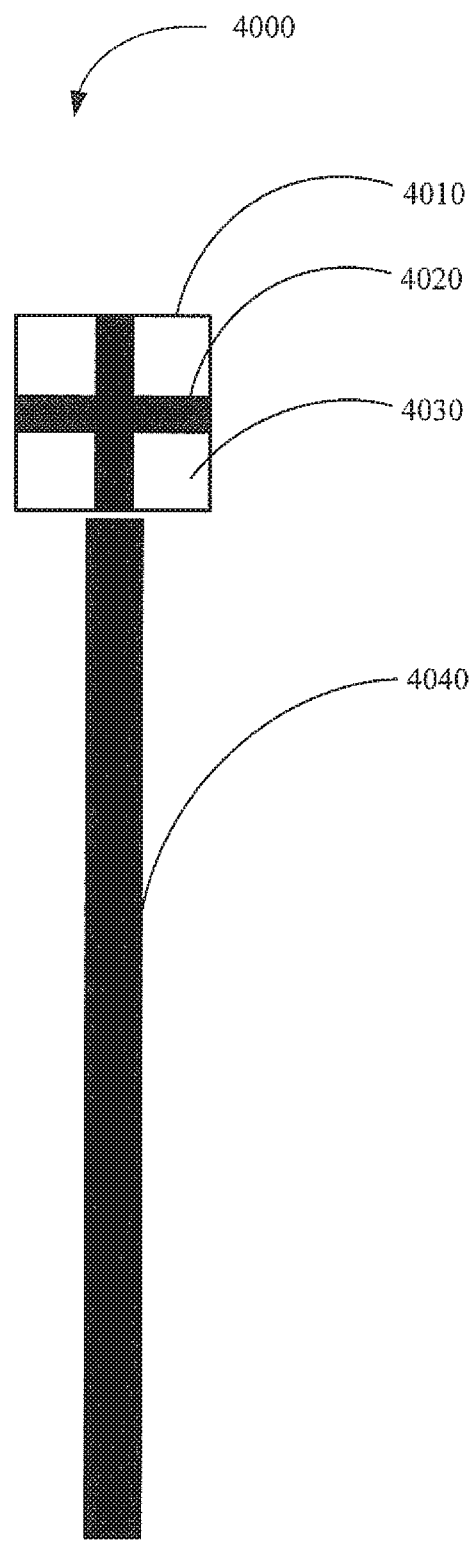
FIG. 4 is a diagram illustrating an example of a vehicle indicator for use in an interface in accordance with the present disclosure.

FIG. 4 is a diagram illustrating an example of a vehicle indicator 4000 for use in an interface including a fleet manager interface. The vehicle indicator 4000 includes a task state indicator 4010, a vehicle mode indicator 4020, a vehicle occupancy indicator 4030, and a temporal state indicator 4040.

The task state indicator 4010 can be used to indicate a task that is being performed by a vehicle or that is assigned to the vehicle including any of: travelling to a pickup destination, including travelling to a destination to pick up one or more passengers or cargo; travelling to a drop-off destination, including travelling to a destination to drop off one or more passengers or cargo; travelling to a maintenance destination, including travelling to a destination at which maintenance or repairs can be performed on the vehicle; and travelling to a refueling destination, including travelling to a destination to refuel the vehicle including petroleum stations or electrical charging stations.

The characteristics of the task state indicator 4010, including the shape and color, can correspond to the task that is being performed by the vehicle. For example, the task state indicator 4010 is shown as a square in FIG. 4, which can indicate, for example, that the vehicle is travelling to a pick up destination. In an implementation, a circular shape of the task state indicator 4010 can indicate that the vehicle is travelling to a drop-off destination. Different shapes and colors can indicate different tasks being performed by the vehicle.

The vehicle mode indicator 4020 can be used to indicate whether the vehicle is operating in any of: an autonomous mode, including a mode in which the vehicle directs itself or the vehicle is being directed remotely by a computing device; a directed mode, including a mode in which a human operator is directing the vehicle from a remote location; a manual mode, including a mode in which a human operator is operating the vehicle from within the vehicle; and a semi-autonomous mode, including a mode in which the vehicle can switch between the autonomous mode and the manual mode based on the state of the vehicle (e.g., assistive braking can activate when a proximity and acceleration threshold is exceeded) and a mode in which the vehicle is simultaneously being controlled using autonomous features and human operation. For example, the vehicle mode indicator 4020 is shown as a cross in FIG. 4, which can indicate, for example, any of the aforementioned modes.

The vehicle occupancy indicator 4030 can be used to indicate any of: whether the vehicle contains one or more passengers; and the state of the passengers in the vehicle. In an implementation, an occupied vehicle is indicated by the vehicle occupancy indicator 4030 being in a filled state (e.g., the area inside the vehicle occupancy indicator 4030 is the same color as the border around the task state indicator 4010).

The characteristics of the vehicle occupancy indicator 4030, including the color, can be used to indicate an issue associated with the vehicle including any of a passenger issue, including a request for assistance from a passenger inside the vehicle, a traffic issue, including issues relating to traffic congestion, traffic accidents, and construction, a decision issue, including issues relating to a decision that can be made by a vehicle manager regarding whether to take control over the vehicle, reroute the vehicle, establish communication with the vehicle, or indicate that an action with respect to the vehicle has been completed, a physical issue with the state of the vehicle, including issues relating to the operational state of the vehicle (e.g., engine state, fuel state). In an implementation, a default color can be used to indicate that the vehicle is operating in a normal state and that no issues with the vehicle are pending.

The temporal state indicator 4040 can be used to indicate the temporal state of the vehicle in relation to an expected or predicted temporal state. In an implementation, the color of the temporal state indicator 4040 can indicate whether the vehicle is ahead of a scheduled time or behind a scheduled time.

The length of the temporal state indicator 4040 can indicate a magnitude of deviation from the expected or predicted temporal state. The length of the temporal state indicator 4040 can be proportional to the magnitude of the deviation from the expected or predicted temporal state (e.g., directly proportional, inversely proportional, exponentially proportional, logarithmic proportionality).

In another implementation, the length of the temporal state indicator 4040 can be disproportionate with respect to the deviation from the expected or predicted temporal state (e.g., a one-third length indicating a less than five-minute deviation, a two-third length indicating a deviation of more than five minutes and less than fifteen minutes, and a full-length indicating a deviation of greater than fifteen minutes). Other characteristics of the temporal state indicator 4040 can be used to indicate the state of the vehicle, for example, a red color could indicate that the vehicle is behind a scheduled time and a green color could indicate that the vehicle is ahead of a scheduled time.

Figure 5:
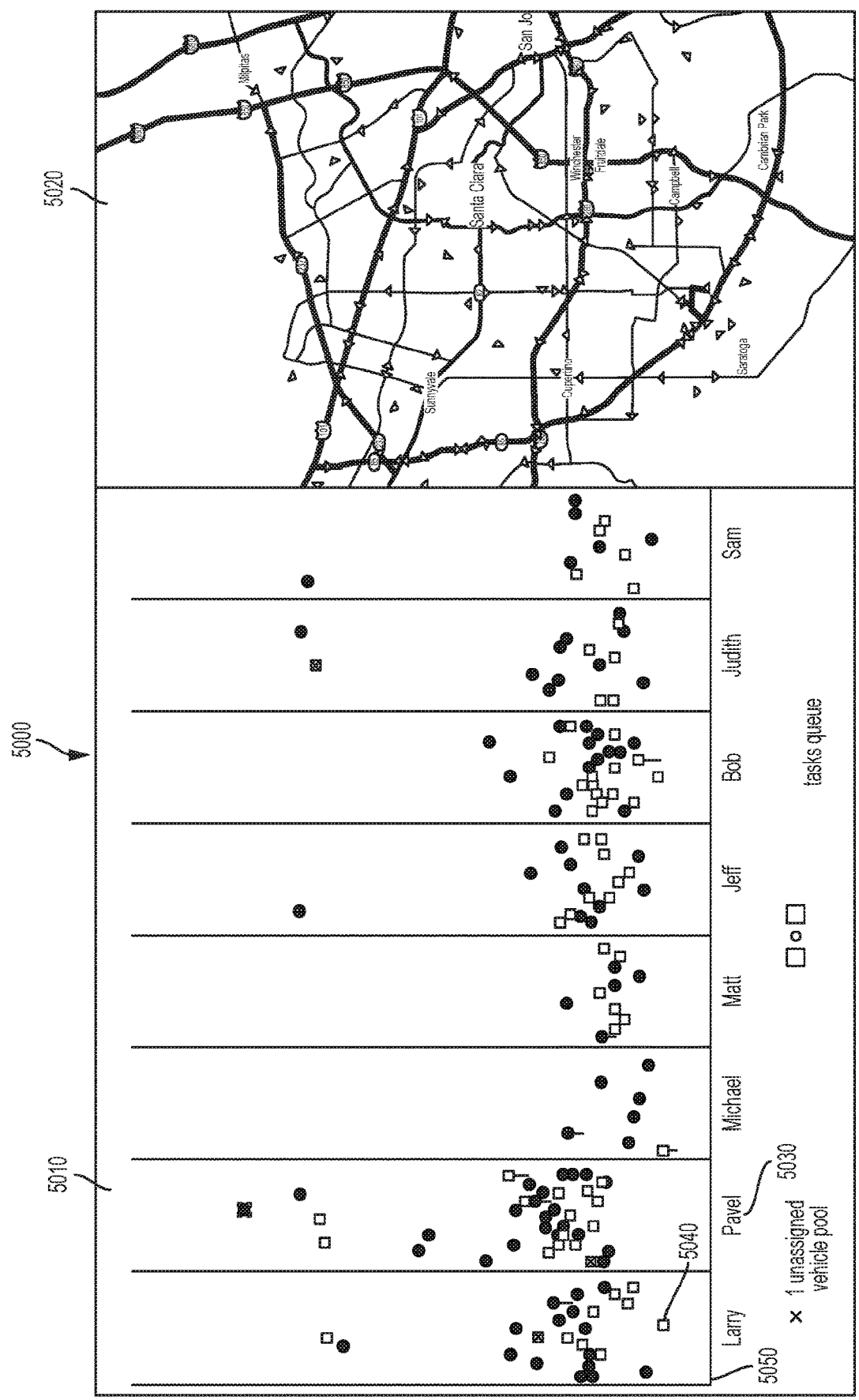
FIG. 5 is a diagram illustrating an example of a fleet manager interface in accordance with the present disclosure.

FIG. 5 is a diagram illustrating an example of a fleet manager interface 5000. The fleet manager interface 5000 can be generated based on one or more instructions that are executable on a computing apparatus, including the controller apparatus 2410 shown in FIG. 2, and which can be stored in a memory of a computing apparatus, including the controller apparatus 2410.

For example, the fleet manager interface 5000 can be generated by the controller apparatus 2410, based on instructions that are interpreted by a client computing device that accesses the controller apparatus 2410 through a computer network. The client computing device can then generate a representation of the fleet manager interface 5000 on a display device.

The fleet manager interface 5000 includes a fleet manager portion 5010, a map portion 5020, a vehicle manager indicator 5030, a vehicle indicator 5040, and a vehicle manager assignment queue 5050, any of which can be based on data associated with the state of physical objects including but not limited to at least one of vehicles, roadways, buildings, and pedestrians.

The fleet manager portion 5010 includes a representation of objects that are being monitored or tracked by the fleet manager and/or the vehicle managers including the association of vehicle managers to vehicles. The objects can include vehicles, including the vehicle 2100 as shown in FIG. 2. The objects can be represented as indicators such as the vehicle indicator 5040, which can be generated as a static image or moving image such as the vehicle indicator 4000 as shown in FIG. 4. Further, the fleet manager portion 5010 can receive input including any of touch inputs, voice inputs, and inputs from an input device. By way of example, vehicle indicators including the vehicle indicator 5040 can be selected by an operator, such as a vehicle manager. Selection of the vehicle indicators can generate data about the state or condition of the respective vehicle represented by the vehicle indicators (e.g., the selected vehicle indicator can indicate whether the vehicle is functioning properly or will arrive at a destination on time).

The map portion 5020 includes a representation of a geographical area including objects within a predefined geographical area. In an implementation, the predefined geographical area can include a geographical area corresponding to the geographical area that includes all or at least some portion of the vehicles that are being monitored by one of the vehicle managers. The objects within the geographical area can include any of the vehicles, and the external objects including roadways, buildings, and pedestrians. The map portion 5020 can receive input including any of touch inputs, voice inputs, and inputs from an input device. The input to the map portion can generate data about the state or condition of the selected vehicles or external objects.

In an implementation, the map portion 5020 contains the same representation of objects that are displayed on the fleet manager portion 5010. In another implementation, the number and type of objects displayed between the fleet manager portion 5010 and the map portion 5020 can differ. For example, the vehicle manager can zoom into a particular geographical area thus displaying only a subset of the objects or vehicles that are represented on the fleet manager portion 5010.

The vehicle manager indicator 5030 is a representation of an identifier for a vehicle manager. Each of the vehicle managers displayed on the fleet manager interface 500 includes a separate vehicle manager indicator. The vehicle manager can be associated with one or more vehicles, which can be distributed or apportioned by the fleet manager or dynamically using machine learning techniques. For example, the fleet manager can modify the number of vehicles assigned to a vehicle manager including any of adding or removing vehicles and transferring one or more vehicles from one vehicle manager to another vehicle manager.

The vehicle indicator 5040 is a representation of the state or condition of an autonomous vehicle, the state including any of a vehicle task, vehicle occupancy, vehicle operational mode (e.g., autonomous operation or manual operation), and a vehicle issue, including but not limited to an issue with the operational state of the vehicle. The vehicle indicator 5040 can include various colors, shapes, patterns, text, pictograms, or any combination thereof, to represent aspects of the state or condition of the vehicle indicator. As an example, the vehicle indicator 5040 can represent an autonomous vehicle that is travelling to a destination in order to pick up a passenger. Further, the vehicle indicator 5040 can represent an autonomous vehicle that is carrying a passenger and travelling to a destination in order to drop the passenger off.

The vehicle manager assignment queue 5050 is a representation of the vehicles that are assigned to a vehicle manager. The vehicles can be assigned to the vehicle manager assignment queue 5050 by the fleet manager or by the vehicle managers themselves or automatically using machine learning techniques. For example, one vehicle manager may realize that they are monitoring too many vehicles and can assign a subset of those vehicles to another vehicle manager that is determined to have additional monitoring capacity. As shown in FIG. 5 the vehicle indicators (e.g., the vehicle indicator 5040) within the vehicle manager assignment queue 5050 are assigned to the vehicle manager associated with the vehicle manager indicator 5030 "Larry." This vehicle manager indicator can represent the real name of the vehicle manager or a username or another identifier.

Figure 6:
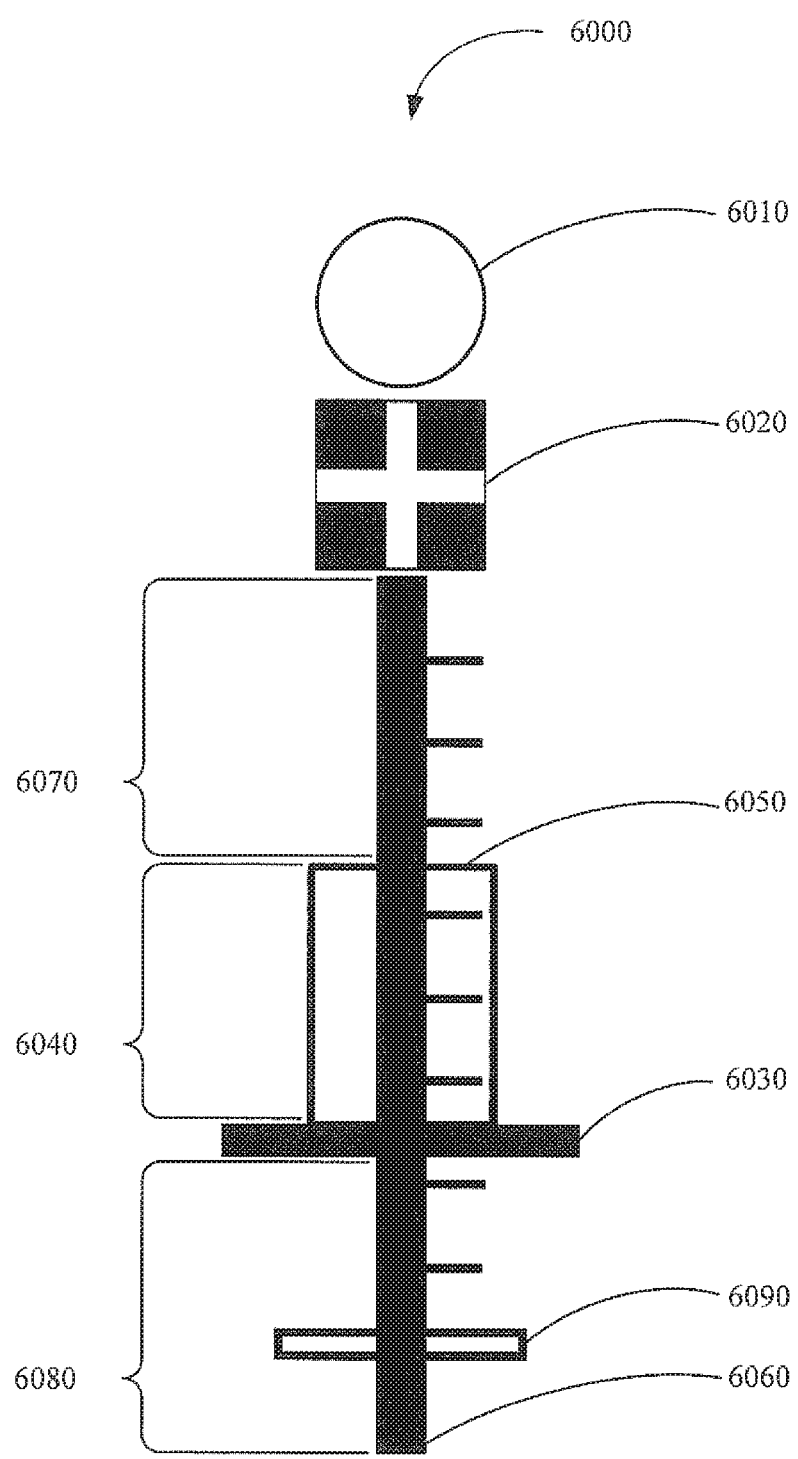
FIG. 6 is a diagram illustrating an example of a vehicle indicator for use in an interface in accordance with the present disclosure.
Figure 7:
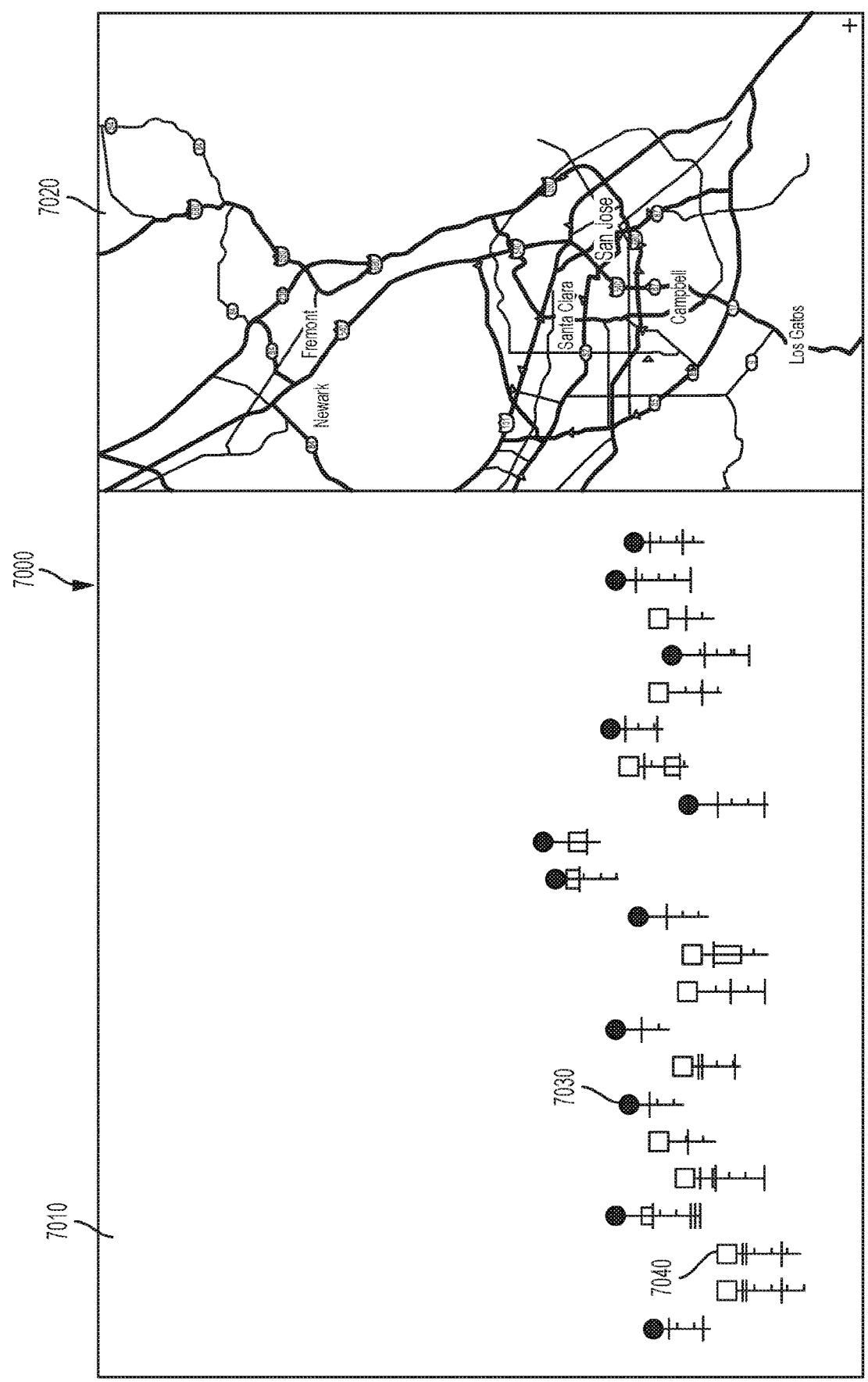
FIG. 7 is a diagram illustrating an example of a vehicle manager interface in accordance with the present disclosure.
Figure 9:
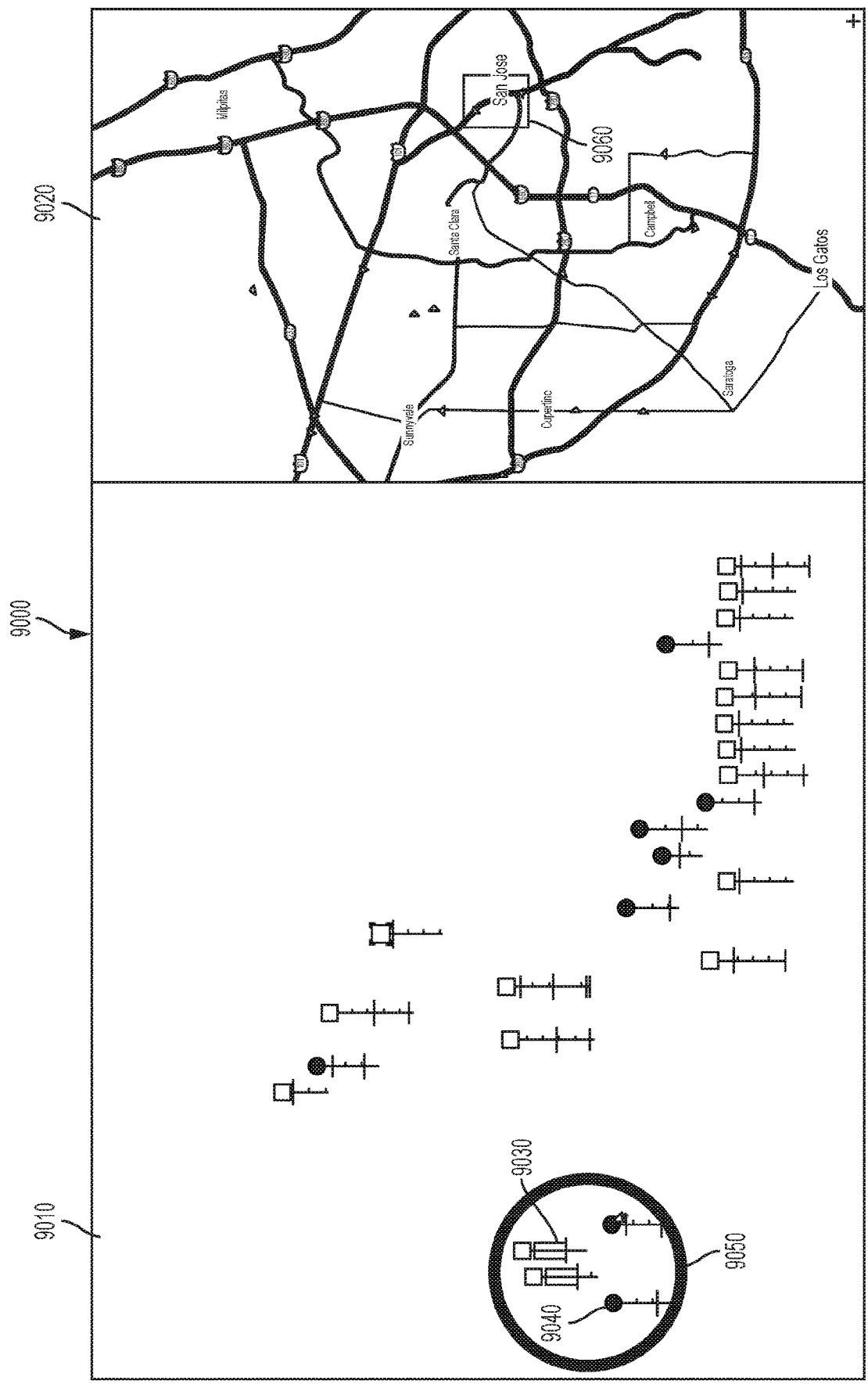
FIG. 9 is a diagram illustrating an example of a vehicle manager interface in accordance with the present disclosure.

FIG. 6 is a diagram illustrating an example of a vehicle indicator 6000 for use in an interface including the fleet manager interface 500 illustrated in FIG. 5, a vehicle manager interface 7000 illustrated in FIG. 7 or a vehicle manager interface 9000 illustrated in FIG. 9.

The vehicle indicator 6000 includes a next task indicator 6010, a current task indicator 6020, an actual progress indicator 6030, a deviation magnitude indicator 6040, an expected progress indicator 6050, a time scale 6060, a time to completion 6070, an elapsed time 6080, and a time compression indicator 6090.

The next task indicator 6010 can be used to indicate a task that is assigned to the vehicle and that is not currently being performed. The next task indicator 6010 can indicate a task that will be performed following performance of a current task (e.g., a current task associated with the current task indicator 6020). For example, the next task indicator 6010 can indicate that a drop off will occur after the current task associated with the current task indicator 6020 is completed. In an implementation, an interaction with the next task indicator 6010 (e.g., selecting the next task indicator 6010) can show a description of the task that will be performed next.

The current task indicator 6020 can be used to indicate a task that is currently being performed by a vehicle. For example, the current task indicator 6020 can include picking up a passenger at a designated location. In an implementation, an interaction with the current task indicator 6020 (e.g., selecting the current task indicator 6020) can show a description of the task that is currently being performed.

The next task indicator 6010 and the current task indicator 6020 can be associated with tasks including but not limited to any of, travelling to a pickup destination, including travelling to a destination to pick up one or more passengers or cargo, travelling to a drop-off destination, including travelling to a destination to drop off one or more passengers or cargo, travelling to a maintenance destination, including travelling to a destination at which maintenance or repairs can be performed on the vehicle; and travelling to a refueling destination, including travelling to a destination to refuel the vehicle including petroleum stations or electrical charging stations.

The shape of the next task indicator 6010 or the current task indicator 6020 can correspond to the task that is being performed by the vehicle. For example, the next task indicator 6010, is shown as a circle in FIG. 6, which indicates that the vehicle is travelling to a drop off destination. The circular shape of the current task indicator 6020 can indicate that the vehicle is travelling to a pick up destination. The shape can include but is not limited to circles, squares, triangles, rectangles, etc.

A pattern (e.g., cross shape, zig-zag) in the next task indicator 6010 or the current task indicator 6020 can indicate whether the vehicle is operating in any of an autonomous mode, including a mode in which the vehicle directs itself or the vehicle is being directed remotely by a computing device, a directed mode, including a mode in which a human operator is directing the vehicle from a remote location, a manual mode, including a mode in which a human operator is operating the vehicle from within the vehicle, and a semi-autonomous mode, including a mode in which the vehicle can switch between the autonomous mode and the manual mode based on the state of the vehicle and a mode in which the vehicle is simultaneously being controlled using autonomous features and human operation. For example, the vehicle mode indicator 4020 is shown as a cross in FIG. 4, which can indicate, for example, any of the aforementioned modes.

The characteristics, including a fill, of the next task indicator 6010 or the current task indicator 6020 can be used to indicate whether the vehicle contains one or more passengers. In an implementation, an occupied vehicle is indicated by the next task indicator 6010 or the current task indicator 6020 being in a filled state. For example, no fill (e.g., no pattern, no shading, and a light color) could be used to indicate that the vehicle does not contain occupants.

The color of the next task indicator 6010 or the current task indicator 6020 can be used to indicate an issue associated with the vehicle including any of a passenger issue, including a request for assistance from a passenger inside the vehicle, a traffic issue, including issues relating to traffic congestion, traffic accidents, and construction, a decision issue, including issues relating to a decision that can be made by a vehicle manager regarding whether to take control over the vehicle, a physical issue with the state of the vehicle, including issues relating to the operational state of the vehicle (e.g., engine state, fuel state). In an implementation, a default color can be used to indicate that the vehicle is operating in a normal state and that no issues with the vehicle are pending.

The actual progress indicator 6030 indicates the actual portion of a route distance that has been traversed, or time that has passed, on the way to a destination. For example, if the progress indicator is at the halfway point of the time scale 6060, half of the route distance has been completed, or half of the estimated travel time has passed.

The expected progress indicator 6050 indicates a portion of a route distance that was estimated to have been completed by the vehicle by the current time and can include a portion of the estimated time to travel to a destination or a portion of the estimated distance that has been traversed by the vehicle. The deviation magnitude indicator 6040 indicates the portion of the route distance or the portion of the travel time by which the expected progress time (indicated by the expected progress indicator 6050) deviates from the actual progress time (indicated by the actual progress indicator 6030).

The time scale 6060 indicates the total travel time or total travel distance to complete a route for the vehicle. For example, if the time scale 6060 is representative of a total travel time of thirty minutes, half of the time scale 6060 is fifteen minutes. In the event that the time scale 6060 is for a longer time period, the time compression indicator 6090 can indicate that a portion of the time scale 6060 that is not proportional to the remaining part of the time scale 6060 has elapsed. For example, the time compression indicator 6090 can indicate that half of the time scale 6060 has elapsed. By way of example, the elapsed time 6080 indicates the travel time that has elapsed on the way to a destination.

Total completion time for a route can be represented by a length of the time scale 6060 which includes the length of the deviation magnitude indicator 6040, the length of the time to completion 6070, and the length of the elapsed time 6080. By way of example, the time to completion 6070 indicates the remaining travel time before the vehicle arrives at the destination or completes the associated/assigned task.

FIG. 7 is a diagram illustrating an example of a vehicle manager interface 7000. The vehicle manager interface 7000 can be generated based on one or more instructions that are executable on a computing apparatus, including the controller apparatus 2410 as shown in FIG. 2, and which can be stored in a memory of a computing apparatus, including the controller apparatus 2410.

For example, the vehicle manager interface 7000 can be generated by the controller apparatus 2410, based on instructions that are interpreted by a client computing device that accesses the controller apparatus 2410 through a computer network. The client computing device can then generate a representation of the vehicle manager interface 7000 on a display device.

The vehicle manager interface 7000 includes a vehicle manager portion 7010, a map portion 7020, a vehicle indicator 7030, and a vehicle indicator 7040, any of which can be based on data associated with the state of physical objects including any of vehicles and external objects including but not limited to pedestrians, cyclists, roadways, and buildings.

The vehicle manager portion 7010 includes a representation of objects that are being monitored or tracked by the vehicle manager utilizing the vehicle manager interface 7000. A plurality of vehicle managers can be monitoring a plurality of vehicles each with their own specific interface. The objects can include vehicles, including the vehicle 2100 shown in FIG. 2. The objects can be represented as indicators such as the vehicle indicator 7030, which can be generated as a variety of images including but not limited to as a static image, a dynamic image, a moving image, a live photo or video feed, or any combination thereof. Further, the vehicle manager portion 7010 can receive input including any of touch inputs, voice inputs, and inputs from an input device.

The map portion 7020 includes a representation of a geographical area including objects within the geographical area. The objects within the geographical area can include any of the vehicles and the external objects including roadways, buildings, cyclists, and pedestrians. In an implementation, the map portion 7020 can have similar or different objects represented as the objects represented by the vehicle manager portion 7010.

The vehicle indicator 7030 and the vehicle indicator 7040 are representations of the state or condition of an autonomous vehicle, including any of a vehicle task, vehicle occupancy, vehicle operational mode (e.g., autonomous operation or manual operation), and a vehicle issue, including but not limited to an issue with the operational state of the vehicle. The vehicle indicator 7030 and the vehicle indicator 7040 can include various colors, shapes, patterns, text, or pictograms, to represent aspects of the state or condition of the autonomous vehicle.

As an example, the vehicle indicator 7030 can represent an autonomous vehicle that is travelling to a destination in order to pick up a passenger. Further, the vehicle indicator 7040 can represent an autonomous vehicle that is carrying another passenger and travelling to a destination in order to drop that passenger off. The different tasks or actions that the respective autonomous vehicles are carrying out result in the graphical display differences between the vehicle indicators 7030 and 7040 (e.g., the vehicle indicator 7030 has a filled in circle and the vehicle indicator 7040 has an unfilled square).

Figure 8:
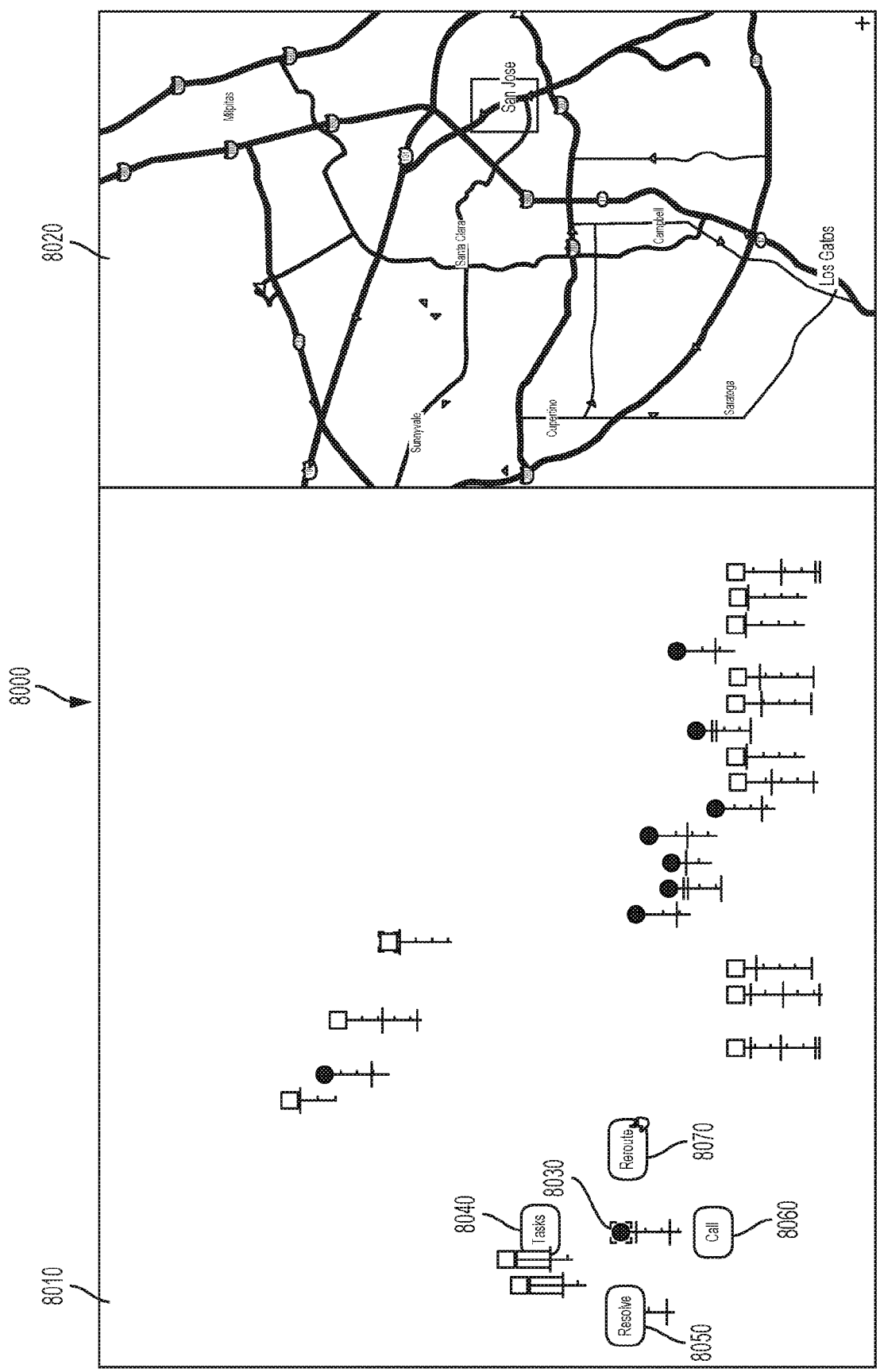
FIG. 8 is a diagram illustrating an example of a vehicle manager interface in accordance with the present disclosure.

FIG. 8 is a diagram illustrating an example of a vehicle manager interface 8000. The vehicle manager interface 8000 can be generated based on one or more instructions that are executable on a computing apparatus, including the controller apparatus 2410 as shown in FIG. 2, and which can be stored in a memory of a computing apparatus, including the controller apparatus 2410.

For example, the vehicle manager interface 8000 can be generated by the controller apparatus 2410, based on instructions that are interpreted by a client computing device that accesses the controller apparatus 2410 through a computer network. The client computing device can then generate a representation of the vehicle manager interface 8000 on a display device.

The vehicle manager interface 8000 resembles the vehicle manager interface 7000 and includes a vehicle manager portion 8010 (similar to the vehicle manager portion 7010 as shown in FIG. 7), a map portion 8020 (similar to the map portion 7020 as shown in FIG. 7), a vehicle indicator 8030, a task control 8040, a resolved control 8050, a call control 8060, and a reroute control 8070, any of which can be based on data associated with the state of physical objects including but not limited to at least one of vehicles, roadways, buildings, and pedestrians. In another implementation, the vehicle manager interface 8000 includes different control functions other than the task control 8040, the resolved control 8050, the call control 8060, and the reroute control 8070 that enable the vehicle manager to interface with and control various aspects of the respective autonomous vehicle or object being monitored or tracked.

The vehicle manager portion 8010 includes a representation of objects that are being monitored or tracked. The objects can include vehicles, including the vehicle 2100 shown in FIG. 2. The objects can be represented as indicators such as the vehicle indicator 8030, which can be generated as a static image or moving image or a different type of image. Further, the vehicle manager portion 8010 can receive input including any of touch inputs, voice inputs, and inputs from an input device. By way of example, vehicle indicators including the vehicle indicator 8030 can be selected by an operator of the vehicle manager interface 8000, such as a vehicle manager. Selection of the vehicle indicators can generate data about the state or condition of the respective vehicle represented by the vehicle indicators (e.g., the selected vehicle indicator can indicate whether the vehicle will arrive at a destination on time).

The map portion 8020 includes a representation of a geographical area including objects within the geographical area. The objects within the geographical area can include any of the vehicles and the external objects including but not limited to roadways, buildings, cyclists, and pedestrians. The map portion 8020 can receive input including any of touch inputs, voice inputs, and inputs from an input device. The input to the map portion can generate data about the state or condition of the selected vehicles or external objects. In an implementation, the map portion 8020 can have similar or different objects represented as the objects represented by the vehicle manager portion 8010.

For example, selecting a building, such as a stadium, could generate data indicating that a sporting event is taking place at the stadium within a certain time frame. Accordingly, the vehicle manager, can anticipate congestion in the vicinity of the stadium at the conclusion of the sporting event, due to the increased traffic flow resulting from patrons leaving the stadium. Therefore, the vehicle manager can reroute or change the completion time of one of the autonomous vehicles that they are monitoring and that is scheduled to carry out a specific task near the stadium at the conclusion of the sporting event.

The vehicle indicator 8030 includes a representation of the state or condition of a vehicle (e.g., an autonomous vehicle or a human driven vehicle) and includes any of a vehicle task, vehicle occupancy, vehicle operational mode (e.g., autonomous operation or manual operation), and a vehicle issue, including but not limited to an issue with the operational state of the vehicle. The vehicle indicator 8030 can include various characteristics including colors, shapes, patterns, text, or pictograms, to represent aspects of the state or condition of the vehicle indicator. As an example, the vehicle indicator 8030 can represent an autonomous vehicle that is travelling to a destination in order to pick up a passenger. Or the vehicle indicator 8030 can represent an autonomous vehicle that is carrying a passenger and travelling to a destination in order to drop the passenger off.

Any of the task control 8040, the resolved control 8050, the call control 8060, and the reroute control 8070, can be controlled or modified based on an input including any of a user input based on an input received through an input device including a tactile input device (e.g., a keyboard, mouse, or touchscreen), an audio input device (e.g., a microphone), and a visual input device (e.g., a camera). Moreover, any of the task control 8040, the task resolved control 8050, the call control 8060, and the reroute control 8070, can be controlled or modified based on instructions, such as computer program instructions (e.g., instructions to select vehicle indicators that meet pre-established criteria such as a common destination).

The task control 8040 can be used to modify the task that is associated with a vehicle. For example, the vehicle associated with the vehicle indicator 8030 may have completed a drop off. A vehicle manager can interact with the task control 8040 and modify the vehicle task to indicate that the vehicle should now pick up a passenger instead of completing a previously assigned next task. The task can be modified and/or updated while the task completion is in progress or in regards to an upcoming task. For example, the current task can be set for delivery of a package at a certain time but based on traffic conditions, the current task is updated to pick up a passenger nearby and drop them off at a location that isn't within the traffic congestion area. In another example, one of the upcoming tasks of the vehicle can be modified/updated/deleted while the vehicle is completing a current unrelated task.

The resolved control 8050 can be used to indicate that an issued related to the vehicle has been resolved or completed by the vehicle manager. For example, after a vehicle manager receives a help request from a vehicle associated with the vehicle indicator 8030 or a passenger of the vehicle, and provides assistance to the vehicle, the resolved control 8050 can be activated by the vehicle manager to indicate that the issue has been resolved and is no longer pending. In an implementation, activating the resolved control 8050 can modify vehicle data associated with the vehicle including a vehicle task urgency that includes an indication of the urgency of a vehicle request or a vehicle task (e.g., an ambulance carrying a patient to a hospital). For example, a vehicle carrying a patient in urgent need of medical help, could send a request to a vehicle manager for an optimized rerouting and once the vehicle manager takes care of this request or concludes that additional help is needed, the vehicle manager can interact with the resolved control 8050 to update the status of the request.

The call control 8060 can used to contact and communicate with the vehicle associated with the vehicle indicator 8030. For example, when the call control 8060 is activated, a vehicle manager can interact with an occupant or passenger of the vehicle associated with the vehicle indicator 8030. In an implementation, when the call control 8060 is activated, any of an audio connection or an audio and video connection (e.g., live video communication feeds) can be established with the vehicle associated with the vehicle indicator 8030.

The reroute control 8070 can be used to modify a route associated with a vehicle. For example, the vehicle associated with the vehicle indicator 8030 could be in transit to a destination via a route that will pass through heavily congested traffic. The reroute control 8070 could be used to reroute the vehicle to avoid entering the area with the heavily congested traffic. In another implementation, the reroute control 8070 can be a different type of control that provides tele-operation of autonomous vehicles FIG. 9 is a diagram illustrating an example of a vehicle manager interface 9000. The vehicle manager interface 9000 can be generated based on one or more instructions that are executable on a computing apparatus, including the controller apparatus 2410, and which can be stored in a memory of a computing apparatus, including the controller apparatus 2410.

For example, the vehicle manager interface 9000 can be generated by the controller apparatus 2410, based on instructions that are interpreted by a client computing device that accesses the controller apparatus 2410 through a computer network. The client computing device can then generate a representation of the vehicle manager interface 9000 on a display device.

The vehicle manager interface 9000 resembles the vehicle manager interface 8000 as shown in FIG. 8 and includes a vehicle manager portion 9010, a map portion 9020, a vehicle indicator 9030, a vehicle indicator 9040, a cluster control 9050, and an area selection control 9060, any of which can be based on data associated with the state of physical objects including but not limited to at least one of vehicles, roadways, buildings, and pedestrians.

The vehicle manager portion 9010 includes a representation of objects that are being monitored or tracked. The objects can include vehicles, including the vehicle 2100 shown in FIG. 2. The objects can be represented as indicators such as the vehicle indicator 9030, which can be generated as a static image or moving image or any other type of image. Further, the vehicle manager portion 9010 can receive input including any of touch inputs, voice inputs, and inputs from an input device.

By way of example, vehicle indicators including the vehicle indicator 9030 and the vehicle indicator 9040 can be selected by an operator, such as a vehicle manager. Selection of the vehicle indicators can generate data about the state or condition of the respective vehicle represented by the vehicle indicators (e.g., the selected vehicle indicator can indicate whether the vehicle will arrive at a destination on time).

The map portion 9020 includes a representation of a geographical area including objects within the geographical area. The objects within the geographical area can include any of the vehicles, and the external objects including but not limited to roadways, buildings, cyclists and pedestrians. The map portion 9020 can receive input including any of touch inputs, voice inputs, and inputs from an input device. The input to the map portion can generate data about the state or condition of the selected vehicles or external objects. For example, selecting a building, such as a stadium, could generate data indicating that a sporting event is taking place at the stadium within a certain time frame. Accordingly, the vehicle manager, can anticipate congestion in the vicinity of the stadium at the conclusion of the sporting event, due to the increased traffic flow resulting from patrons leaving the stadium and reroute the vehicle.

The vehicle indicator 9030 and the vehicle indicator 9040 are representations of the state or condition of two separate autonomous vehicles, including any of a vehicle task, vehicle occupancy, vehicle operational mode (e.g., autonomous operation or manual operation), and a vehicle issue, including an issue with the operational state of the vehicle. The vehicle indicator 9030 and the vehicle indicator 9040 can include various colors, shapes, patterns, text, or pictograms, to represent aspects of the state or condition of the vehicle indicator. As an example, the vehicle indicator 9030 can represent an autonomous vehicle that is travelling to a destination in order to pick up a passenger. Further, the vehicle indicator 9040 can represent an autonomous vehicle that is carrying another passenger and travelling to a destination in order to drop that passenger off.

The cluster control 9050 and the area selection control 9060 include a control element that can be controlled or modified based on an input including any of a user input based on an input received through an input device including a tactile input device (e.g., a keyboard, mouse, or touchscreen), an audio input device (e.g., a microphone), and a visual input device (e.g., a camera). Moreover, the cluster control 9050 and the area selection control 9060 element can be controlled or modified based on instructions, such as computer program instructions (e.g., instructions to select vehicle indicators that meet pre-established criteria such as a common destination).

The area selection control 9060 is a control element that can be controlled or modified to select a section of the map portion 9020. For example, a rectangular section of the map can be selected or highlighted by the vehicle manager in order to define that the vehicles within the geographical area of the map will be monitored and selected or clustered on the vehicle manager portion 9010 that corresponds to the selected part of the map portion 9020. The objects within the selected section of the map portion 9020 can be monitored and organized according to a cluster criteria including any of routes, destinations, and points of departure in common. As illustrated in FIG. 9, the cluster control 9050 can indicate that the vehicle indication 9030 and vehicle indication 9040 are part of a cluster group based on shared cluster criteria (e.g., they share similar routes).

Figure 10:
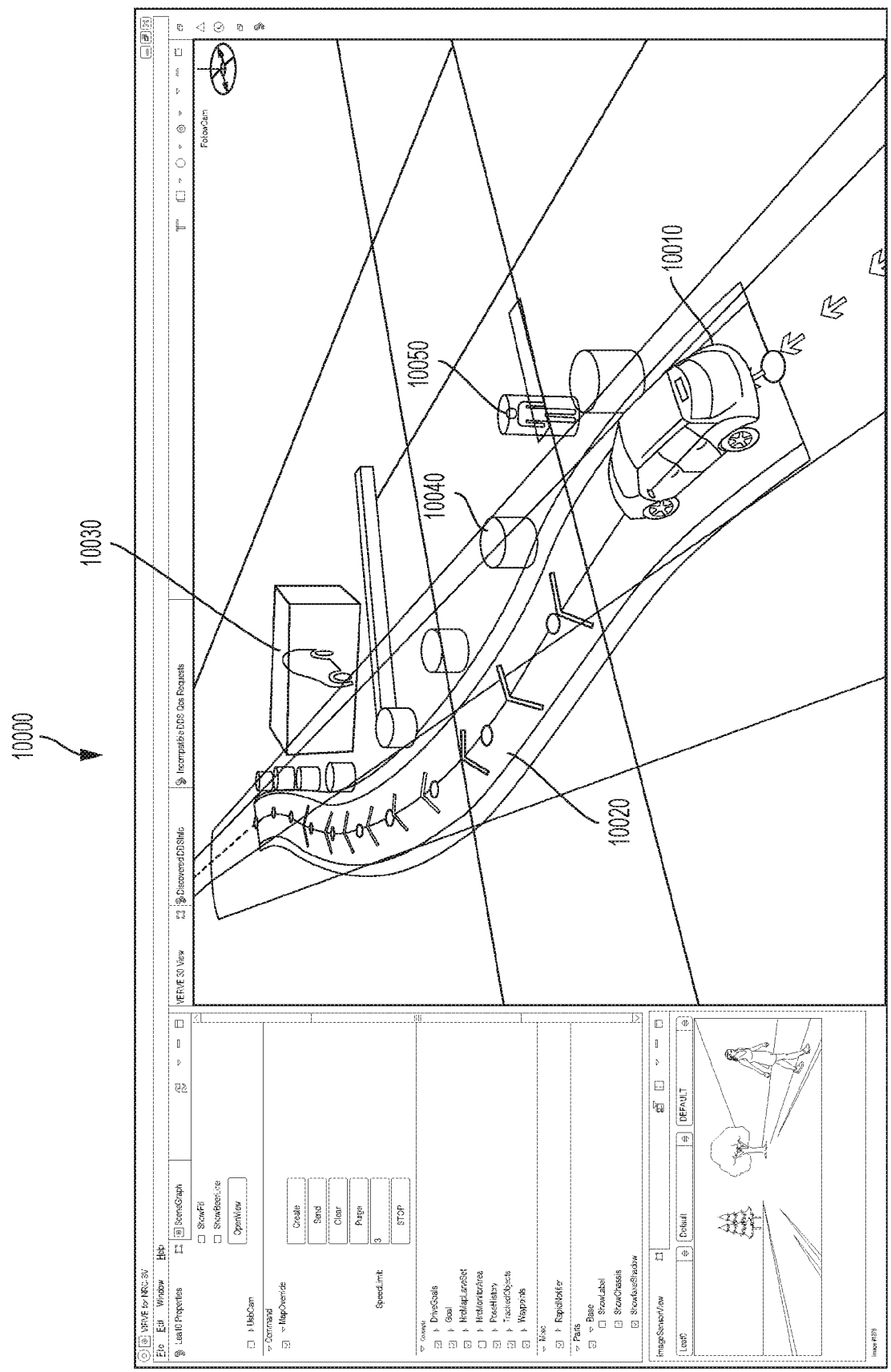
FIG. 10 is a diagram illustrating an example of a vehicle manager interface in accordance with the present disclosure.

FIG. 10 is a diagram illustrating an example of a vehicle manager interface 10000. The vehicle manager interface 10000 can be generated based on one or more instructions that are executable on a computing apparatus, including the controller apparatus 2410 as shown in FIG. 2, and which can be stored in a memory of a computing apparatus, including the controller apparatus 2410.

For example, the vehicle manager interface 10000 can be generated by the controller apparatus 2410, based on instructions that are interpreted by a client computing device that accesses the controller apparatus 2410 through a computer network. The client computing device can then generate a representation of the vehicle manager interface 10000 on a display device.

The vehicle manager interface 10000 includes a vehicle indicator 10010, a path indicator 10020, an external object indicator 10030, an obstruction indicator 10040, a pedestrian indicator 10050, any of which can be based on data associated with the state of physical objects including but not limited to at least one of vehicles, roadways, buildings, and pedestrians. A plurality of configurations of external objects, obstructions, pedestrians, and any combination thereof can be displayed on the vehicle manager interface 10000. The vehicle indicator 10010 can be used to represent a vehicle. In this example, the vehicle is represented as a three dimensional model, however the vehicle indicator 10010 can be represented in different ways including any of a two dimensional image and a pictogram, such as an icon.

The path indicator 10020 can be used to represent a path between the current vehicle location and a vehicle destination. In an implementation, a vehicle manager can guide the vehicle associated with the vehicle indicator 10010 along the path indicated by the path indicator 10020. For example, when providing remote assistance to a vehicle associated with the vehicle indicator 10010, a path indicator such as a virtual lane can be generated in order to provide a visual representation of the path that the vehicle can travel on that is illustrated by the path indicator 10020.

The external object indicator 10030 can be used to represent external objects such as other vehicles that could change the intended route of the vehicle as an example. The obstruction indicator 10040 can be used to represent external objects that can obstruct the movement of the vehicle represented by the vehicle indicator 10010. The pedestrian indicator 10050 can be used to represent an external object including a pedestrian or a cyclist or another moving object. The pedestrian indicator 10050 can be indicated with a distinctive color scheme that is different from other external objects represented by the external object indicator 10030 or the obstruction indicator 10040. In this way, pedestrians can be distinguished from other types of external objects to provide additional awareness and avoidance capabilities. In an implementation, the external object indicator 10030, the obstruction indicator 10040, and the pedestrian indicator 10050, or any combination thereof, can be represented by the same or similar type of indicator that covers all objects that could affect at least one parameter (e.g., route, travel time, etc.) of the vehicle represented by the vehicle indicator 10010.

The steps, or operations, of any method, process, or algorithm described in connection with the implementations of the disclosed technology herein, may be implemented in hardware, firmware, software executed by hardware, circuitry, or any combination thereof. To facilitate explanation, the processes 11000-15000, shown in FIGS. 11-15, are depicted and described as a series of operations. However, the operations in accordance with this disclosure can occur in various orders or concurrently. Additionally, operations in accordance with this disclosure may occur with other operations not presented and described herein.

Figure 11:
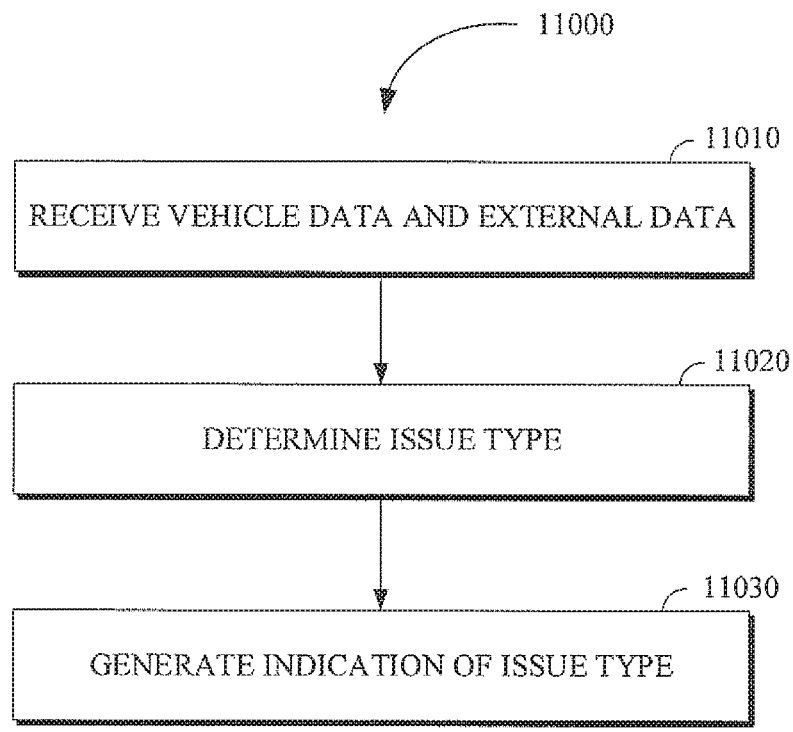
FIG. 11 is a flow chart of a technique for vehicle monitoring in accordance with the present disclosure.

FIG. 11 is a flow chart of a technique 11000 for vehicle monitoring in accordance with the present disclosure. The technique 11000 can be utilized by a vehicle monitoring system that can include but is not limited to at least one fleet manager, vehicle manager, and the aforementioned interfaces. Some or all aspects of the technique 11000 for vehicle monitoring may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 11000 for vehicle monitoring can be implemented in a system combining some or all of the features described in this disclosure.

At operation 11010, vehicle data and external data is received by, for example, a communication system or other device of the vehicle monitoring system. For example, the vehicle data can be received from vehicles including a device or apparatus (e.g., a conveyance) that is used to transport objects including any of a passenger and cargo. The vehicles can include an autonomous vehicle or a vehicle that is driven by a human driver or a semi-autonomous vehicle.

The vehicle data and the external data can be based on the vehicle data and external data from within a predetermined vehicle distance of the vehicle or a predetermined area, for example, corresponding to the vehicle. The vehicle data can include a vehicle state of the vehicle and the external data can include an infrastructure state of an infrastructure that includes external objects (e.g., other vehicles, pedestrians, cyclists, buildings, bridges, roadways). In other words, the external data includes external states for each of a plurality of external objects that are in the environment surrounding the vehicle.

The vehicle data can include but is not limited to any data corresponding to: kinetic data relating to any of the velocity and acceleration of a vehicle; location data, including the geographical location of a vehicle (e.g., the latitude and longitude of the vehicle) or the location of the vehicle with respect to another object; vehicle position, including the orientation and inclination (e.g., slope of the vehicle on an incline) of the vehicle; the operational state of the vehicle, including the electrical state or mechanical state of the vehicle (e.g., health of the electrical vehicle systems, mechanical vehicle systems, tire pressure, etc.); maintenance data related to ongoing maintenance of the vehicle; vehicle energy state data, including an amount of fuel remaining or an amount of battery charge remaining; sensor data based on outputs from sensors including, optical sensors, audio sensors, and motion sensors; internal state data, including a temperature and humidity inside the passenger cabin of the vehicle; and a current task (e.g., pick up a passenger) of the vehicle.

The external data can include any data corresponding to: external object velocity, including the velocity of any external objects outside the vehicle, including the velocity of other vehicles, pedestrians, and cyclists; external object orientation, including any of an orientation of the external object relative to the vehicle and an orientation such as a compass orientation; external object position, including the geographical position of an external object (e.g., the latitude and longitude of the external object); an external object identity profile; an external object audio profile; an external object electromagnetic profile; and the state of a surface (e.g., the ground) within a predetermined area; traffic signal data; road closure data; construction data; emergency vehicle route data, including the route of emergency vehicles such as ambulances, police vehicles, and fire engines (i.e. fire trucks); infrastructure data, including the location of buildings; environmental data including current and upcoming weather data; and zoning data including the locations of businesses, schools, or residential areas.

At operation 11020, in response to receiving and processing the state data, an issue type of the vehicle is determined based on the vehicle state and at least one of the external states of the external objects. The determination of the issue type can be based on a comparison of the state data to issue type data that includes a plurality of issue types and a corresponding plurality of issue types. For example, the issue type may be determined based on a lookup table or through matching data (e.g., records) in a dataset including a relational database or through machine learning techniques using historical data.

In an implementation, a velocity of the vehicle is determined based on the vehicle data (e.g., by extracting the vehicle velocity attribute from the vehicle data). In response to determining that the vehicle is in an immobile state (e.g., the vehicle velocity is below a velocity threshold, such as a velocity of zero meters per second), the vehicle can be determined to be in an immobile state and the issue type is determined to be an immobility issue type.

At operation 11030, an indication of the issue type is generated for display on an interface (e.g., the interface of a monitoring operator of the vehicle monitoring system) based on the determination of the issue type. The indication of the issue type can be based on a comparison of issue type to a plurality of issue type indicators. The comparison of the issue type to the plurality of issue type indicators can include a matching between the issue type and the plurality of issue type indicators. The matching can be based on an exact match or a degree of similarity between the issue type and the plurality of issue type indicators.

The indication of the issue type can include but is not limited to any of a task state, including a type of task that the vehicle is performing (e.g., performing a drop off or a pick up), an occupancy state, which can be based on sensors in the vehicle that can determine the state of passengers within the vehicle, and an autonomous mode state, which can indicate whether the vehicle is being operated by a computing device (e.g., an autonomous vehicle) or by a human operator or by both (semi-autonomous). The indication of the issue type can include some or all of the features of any of the vehicle indicator 4000 shown in FIG. 4 and the vehicle indicator 6000 shown in FIG. 6. For example, when the issue type is an immobility issue type, the indication can include an indication (e.g., using the color red denoting the vehicle is stopped) of the immobility issue type.

Figure 12:
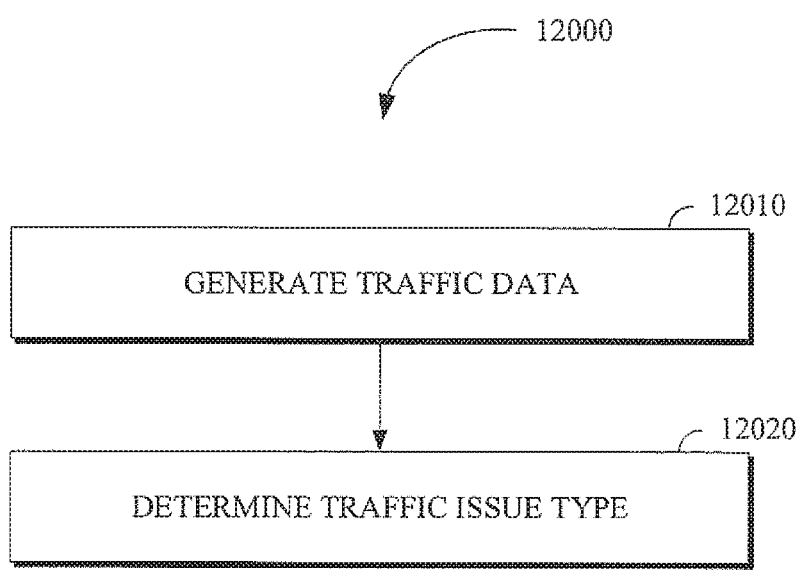
FIG. 12 is a flow chart of a technique for vehicle monitoring in accordance with the present disclosure.

FIG. 12 is a flow chart of a technique 12000 for vehicle monitoring in accordance with the present disclosure. The technique 12000 can be utilized by a vehicle monitoring system that can include but is not limited to at least one fleet manager, vehicle manager, and the aforementioned interfaces. Some or all aspects of the technique 12000 for vehicle monitoring may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 12000 for vehicle monitoring can be implemented in a system combining some or all of the features described in this disclosure.

At operation 12010, traffic data is generated based on any of a number and a location of the external objects in addition to real-time data from other sources (e.g., online traffic data aggregating platforms). For example, the traffic data can include but is not limited to any of a number of vehicles within a predetermined area (e.g., a vehicle density), the location of vehicles in relation to external objects that can disrupt the flow of traffic (e.g., construction sites), the location of the external objects themselves (e.g., fallen trees on the road), the flow of traffic based on the number of vehicles travelling in the same direction or travelling on the same roadways, and historical information for similar time frames.

At operation 12020, a traffic issue type is determined based on the received traffic data. An indication of the issue type can include the traffic issue type. A traffic issue type may include but is not limited to indications based on any of a shape, color, pattern, pictogram, text, and any combination thereof. The indication of the traffic issue type can include some or all of the features of any of the vehicle indicator 4000 shown in FIG. 4 and the vehicle indicator 6000 shown in FIG. 6.

Figure 13:
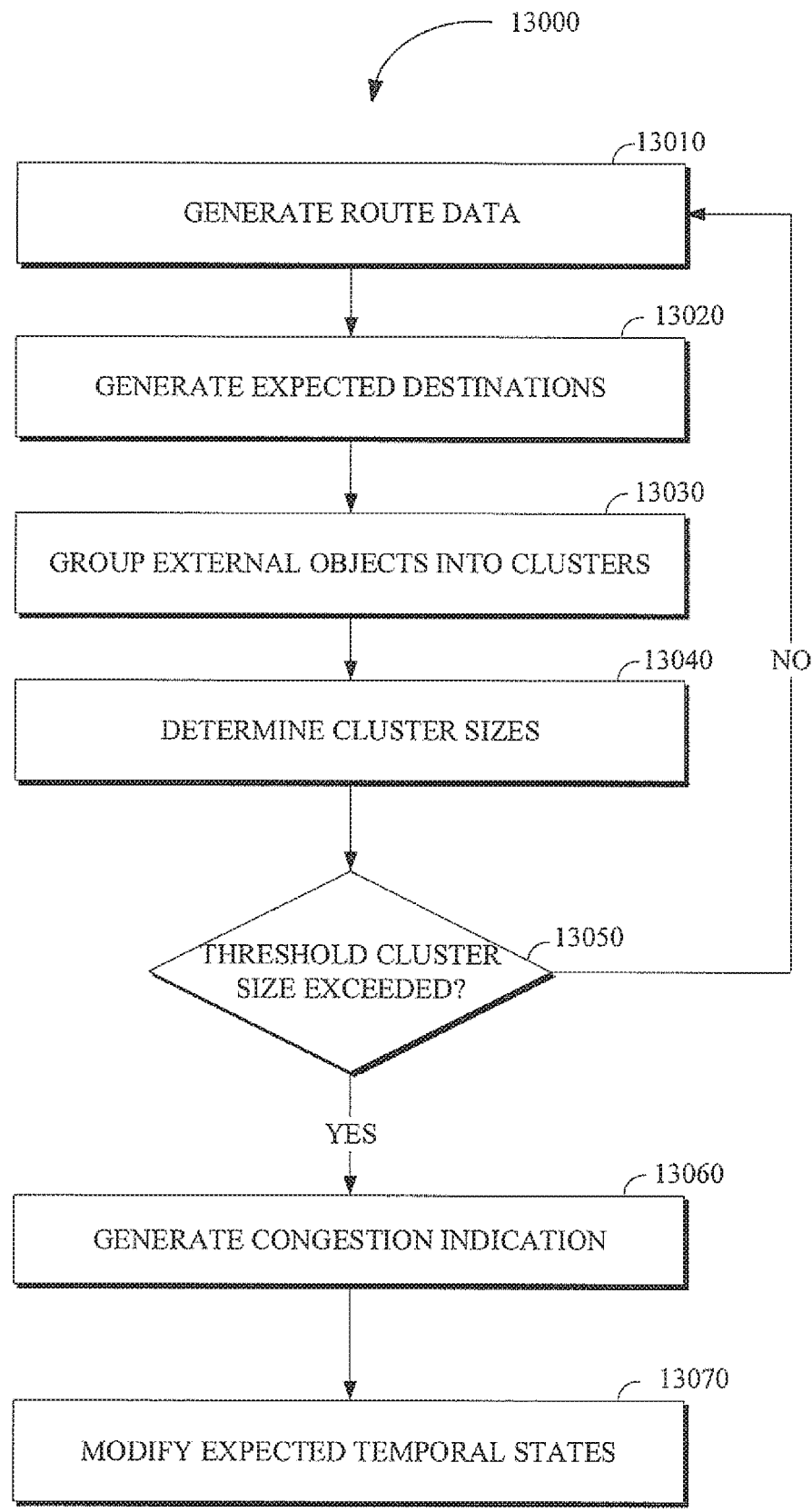
FIG. 13 is a flow chart of a technique for vehicle monitoring in accordance with the present disclosure.

FIG. 13 is a flow chart of a technique 13000 for vehicle monitoring in accordance with the present disclosure. The technique 13000 can be utilized by a vehicle monitoring system that can include but is not limited to at least one fleet manager, vehicle manager, and the aforementioned interfaces. Some or all aspects of the technique 13000 for vehicle monitoring may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 13000 for vehicle monitoring can be implemented in a system combining some or all of the features described in this disclosure.

At operation 13010, route data is generated based on data including but not limited to location states and temporal states of the vehicle relative to expected location states and expected temporal states of the vehicle. For example, the location states can include past and current geographical locations of the vehicle, the expected location states can include a destination location and the route that will be travelled to arrive at the destination location. The temporal states can include the time that a vehicle was at a past location or the current time when the vehicle is at a current location. The expected temporal states can include expected times in the future that the vehicle will be at an expected or destination location. The expected temporal states can be based on the state data and the external data. In an implementation, an issue type (e.g., relating to a malfunction or inefficiency in the operation of a vehicle) can be based on the route data. In another implementation, the route data is based on other sources of data including real-time traffic data, historical data for similar contexts, and preferences.

The route data can indicate a route or path of the vehicle between two or more locations (e.g., an origin location and a destination location). The route data can include timing data associating the route or path of the vehicle with a predetermined time period in which the route or path is traversed. Further the route data can include the position of the vehicle with respect to a geographical area (e.g., a defined geographical area such as a city or state, or an area within a predetermined distance of the vehicle) or objects in the geographical area. For example, the route data can include but is not limited to any of geographical coordinates including latitude and longitude for one or more positions, distances between different geographical coordinates using paths including streets, highways, and freeways, traffic regulation data, including the locations of stop signs, yield signs, and speed limits, and the condition of traffic signals within the geographical area.

The location states of the vehicle can include but is not limited to any of a geographical location (e.g., longitude and latitude, address, or map location) of the vehicle and a reported location of the vehicle. The temporal states of the vehicle can include the time at which the vehicle was at one of the location states.

For example, the route data can indicate that the vehicle is at 42°33'47.1"N 83°11'01.8"W at a time of 5:01.00 p.m. and that the vehicle is at 42.562065"N, −83.160406"W at a time of 5:01.30 p.m. The combination of the positions (location states) of the vehicle with the times (temporal states) the vehicle was at the positions can be used to generate the route data.

At operation 13020, expected destinations of the vehicle are generated based on the expected location states and the expected temporal states. For example, the determination could be made that one hundred vehicles will travel through a single expected destination (e.g., a narrow road through a predetermined area) on the way to their respective destinations. As such, a bottleneck can be determined to occur at the single expected destination due to narrowness of the road and the cluster of one hundred vehicles that will pass through the predetermined area within the expected time frame. This determined bottleneck and any resulting delay could then alter the expected destinations.

At operation 13030, the external objects are grouped into clusters according to the expected destinations. The grouping of the external objects into clusters can be based on grouping criteria including but not limited to any of a position of the vehicles, including a geographic position of the external objects or a position of the geographic objects relative to the vehicle and other vehicles, and an expected position of the vehicles at a predetermined time period. The grouping of external objects into clusters can be used to facilitate management of the vehicles by, for example, vehicle managers, who can later be tasked with routing the vehicles around the clusters of the external objects. For example, if a cluster of external objects is determined along a certain route, the vehicle can be rerouted to avoid the cluster thereby resulting in a decreased travel time to the destination. In another implementation, both the vehicles and the external objects can be grouped according to various attributes and information.

At operation 13040, the cluster sizes of each of the clusters is determined. The sizes of the clusters can be based on a weighted or unweighted counting of the external objects in each of the cluster sizes. The weighting of the cluster size can be based on attributes of external objects in the cluster including any of: the velocity of the external objects (e.g., a slower velocity increases the weighting of the cluster), and the uniformity of destination of the vehicles in relation to the cluster of external objects (e.g., vehicles travelling to the same destination near a cluster of external objects increase the weighting of the cluster). In other words, a higher concentration of external objects and/or vehicles leads to a larger cluster size.

At operation 13050, based on a comparison of the determined cluster size to a threshold cluster size and in response to the cluster size exceeding a threshold cluster size the technique 13000 proceeds to operation 13060. Based on a comparison of the cluster size to a threshold cluster size and in response to the cluster size not exceeding the threshold cluster size, the technique 13000 returns to operation 13010. Determining whether the cluster size exceeds the threshold cluster size can be based on a comparison of the weighted cluster size or unweighted cluster size to the threshold cluster size. The threshold cluster size can be predetermined, based on preferences, or can be determined using machine learning techniques that analyze historical data.

At operation 13060, a cluster indication including but not limited to a congestion indication of each cluster that has a cluster size exceeding the threshold cluster size is generated. For example, the cluster indication could include any of a color, shape, pattern, text, pictogram, number, and any combination thereof, to represent the amount of congestion caused by the cluster. The congestion indication of the traffic issue type can include some or all of the features of any of the vehicle indicator 4000 shown in FIG. 4 and the vehicle indicator 6000 shown in FIG. 6. In another example, the cluster indication can also indicate that although the cluster exceeds the threshold cluster size, that various parameters result in a determination that the congestion near that particular cluster will not result in a delay.

At operation 13070, the expected temporal states of a portion of the vehicles impacted by the clusters that exceed the threshold cluster size are modified. The modification can include any of minimizing differences between the expected temporal states within each of the clusters, minimizing the maximum difference between a temporal state and an expected temporal state, and reducing the distance travelled by the vehicles. For example, the routes travelled by vehicles can be modified to minimize the aggregate deviation from the expected time of arrival at a destination due to the determined cluster of external objects.

Figures 14, 15:
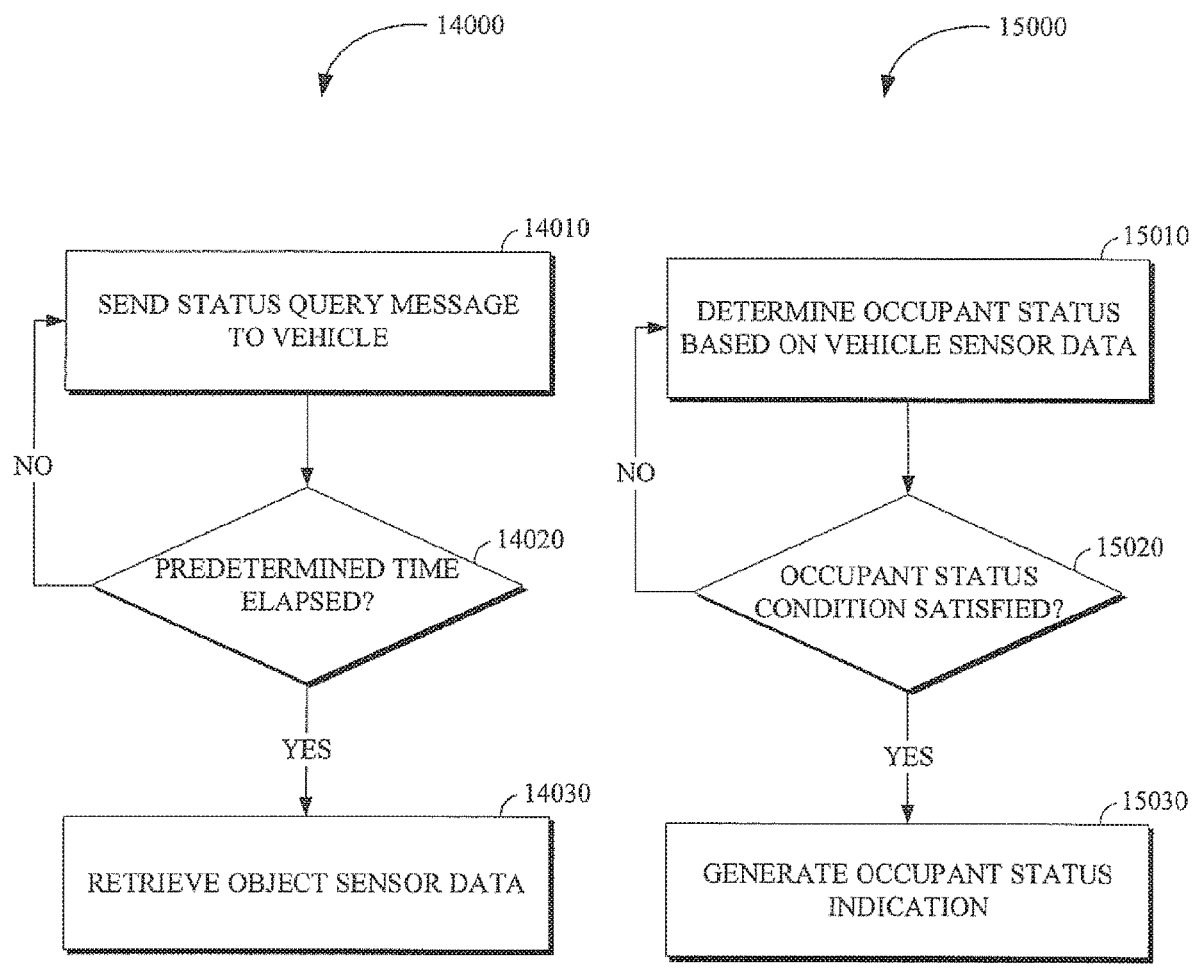
FIG. 14 is a flow chart of a technique for vehicle monitoring in accordance with the present disclosure.
FIG. 15 is a flow chart of a technique for vehicle monitoring in accordance with the present disclosure.

FIG. 14 is a flow chart of a technique 14000 for vehicle monitoring in accordance with the present disclosure. The technique 14000 can be utilized by a vehicle monitoring system that can include but is not limited to at least one fleet manager, vehicle manager, and the aforementioned interfaces. Some or all aspects of the technique 14000 for vehicle monitoring may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 14000 for vehicle monitoring can be implemented in a system combining some or all of the features described in this disclosure.

At operation 14010, a status or state query message is sent to a vehicle by, for example, a communication system of the vehicle monitoring system. The state query message can be sent via a network, for example, the electronic communication network 2300 shown in FIG. 2. In an implementation, the state query message can request a variety of types of information from the vehicle including but not limited to feedback from a driver of the vehicle and vehicle-to-vehicle communication data from the vehicle in relation to conversations with other vehicles. In another implementation, the state query message can include a request for vehicle data from a vehicle and can be sent as a signal including data or data packets (e.g., TCP/IP packets). For example, the state query message can be sent to one or more vehicles and include a request for velocities from the vehicles as well as the state of vehicle systems (e.g., engine state, indicator light state).

At operation 14020, in response to a predetermined time period elapsing before receiving a response to the state query message from the vehicle, the technique 14000 proceeds to operation 14030. In response to a predetermined time period not elapsing before receiving a response to the state query message, the technique 14000 returns to operation 14010 before sending additional requests.

At operation 14030, object sensor data is retrieved based on any of the external objects located within the predetermined area. For example, a vehicle not responding to the state query message could be indicative of a vehicle malfunction (e.g., a communication malfunction) or that the vehicle is not accessible due to an obstruction (e.g., a structure blocking a transmission sent to the vehicle). As such, external objects in the predetermined area that include sensors (e.g., traffic signal cameras) can be queried, and object sensor data can be retrieved from the external objects in order to determine the state of the vehicle. The object sensor data can also include but is not limited to image data from the surrounding environment of the vehicle (e.g., 360 degree image) and other vehicles nearby (e.g., communications that the vehicle had with other surrounding vehicles that could provide information regarding the delay in receiving the response from the vehicle).

FIG. 15 is a flow chart of a technique 15000 for vehicle monitoring in accordance with the present disclosure. The technique 15000 can be utilized by a vehicle monitoring system that can include but is not limited to at least one fleet manager, vehicle manager, and the aforementioned interfaces. Some or all aspects of the technique 15000 for vehicle monitoring may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 15000 for vehicle monitoring can be implemented in a system combining some or all of the features described in this disclosure.

At operation 15010, an occupant state value is determined based on the vehicle data, which can include vehicle sensor data. The vehicle sensor data can be based on the output from at least one sensor in the vehicle. The sensors can include one or more sensors such as the sensor 1360 shown in FIG. 1. By way of example, the number of occupants in the vehicle can be determined based on an optical sensor (e.g., camera inside the vehicle) or a heat sensor that senses the state of the interior of the vehicle. Further, the occupant state value can be based on the state of condition of any occupants in the vehicle. For example, a microphone or camera can be used to determine that an occupant is requesting assistance or that a minor occupant has been left in the vehicle unattended. Further, the occupant state value can be based on state data from the vehicle, which can include a request for assistance.

At operation 15020, in response to the occupant state value satisfying an occupant state condition the process proceeds to operation 15030. In response to the occupant state value not satisfying the occupant state condition the process returns to operation 15020. The occupant state condition can include any of a threshold number of occupants of the vehicle, a threshold occupant activity level (e.g., occupants moving erratically or occupants not moving), and a request for assistance by an occupant.

For example, if the occupant state value indicates no movement has been detected in the car and the occupant state condition requires no level of movement, then the occupant state condition is satisfied and the technique 15000 proceeds to operation 15030. In another implementation, the occupant state value and occupant state condition can be reversed. For example, instead of determining that the occupant state value satisfied the occupant state condition to proceed to operation 15030, the technique 15000 could require that the occupant state condition is not satisfied to proceed to operation 15030. In this example, the occupant state value could again indicate that no movement has been detected in the car and the occupant state condition can require a minimum level of movement and so the technique 15000 could proceed to operation 15030 because the occupant state condition has not been satisfied.

At operation 15030, an occupant state indication is generated and displayed on an interface of the vehicle monitoring system based on the comparison completed in operation 15020. For example, the occupant state indication may include any of a modification of the size, shape, or color of the indication of the issue type, text indicating a number of occupants in the vehicle, and a number indicating the number of occupants in the vehicle. In an implementation, the occupant state indication can include an indication from the vehicle including a representation of the number of occupants. The occupant state indication can include some or all of the features of any of the vehicle indicator 4000 shown in FIG. 4 and the vehicle indicator 6000 shown in FIG. 6.

Figure 16:
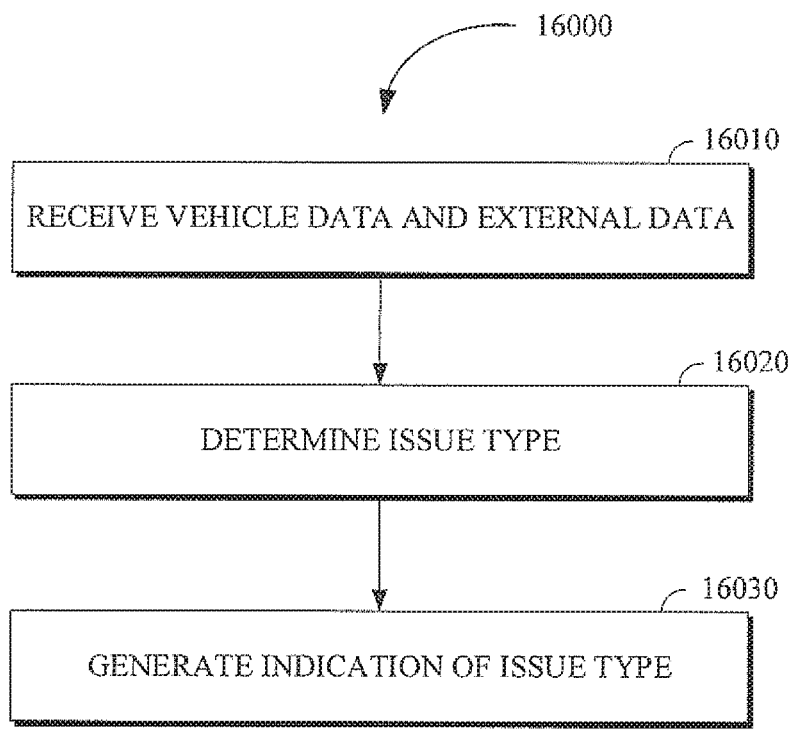
FIG. 16 illustrates a method for vehicle monitoring in accordance with the present disclosure.

FIG. 16 illustrates a method 16000 for vehicle monitoring in accordance with the present disclosure. The method 16000 includes receiving vehicle data and external data associated with a vehicle and a corresponding predetermined area, via operation 16010. The vehicle data includes a vehicle state of the vehicle and the external data includes external states of external objects. The method 16000 includes determining an issue type of the vehicle based on the vehicle state and at least one of the external states, via operation 16020, and generating an indication of the issue type for display on an interface, via operation 16030.

The disclosed technology offers the benefits of more effective vehicle monitoring, including the monitoring of autonomous vehicles. The disclosed technology can efficiently process data relating to the physical state of vehicles and the anticipated routes of the vehicles. This data processing facilitates the prediction of future states of the vehicles, allowing superior diagnosis of issues that affect the vehicles. Further, the disclosed technology may improve the flow of traffic through a transportation network by enabling more rapid identification of flow stoppages (i.e. stopped vehicles that disrupt traffic), thereby allowing for more efficient allocation of assistance to ameliorate the flow stoppages.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for vehicle monitoring, the method comprising:
receiving vehicle data and external data associated with a vehicle and a corresponding predetermined area, wherein the vehicle data includes a vehicle state of the vehicle and the external data includes external states of external objects;
determining an issue type of the vehicle based on the vehicle state and at least one of the external states; and
generating an indication of the issue type for display on an interface.

2. The method of claim 1, further comprising:
generating route data based on location states and temporal states of the vehicle relative to expected location states and expected temporal states of the vehicle, wherein the issue type is based on the route data.

3. The method of claim 2, further comprising:
generating expected destinations of the vehicle based on the expected location states and the expected temporal states;
grouping the external objects into clusters according to the expected destinations;
determining cluster sizes of each of the clusters; and
generating a congestion indication of each cluster that has a cluster size exceeding a threshold cluster size.

4. The method of claim 3, further comprising:
modifying the expected temporal states of a portion of the external objects in the clusters that exceed the threshold cluster size, wherein the modifying comprises minimizing differences between the expected temporal states within each of the clusters.

5. The method of claim 1, further comprising:
generating traffic data based on any of a number and a location of the external objects; and
determining a traffic issue based on the traffic data, wherein the indication of the issue type includes the traffic issue.

6. The method of claim 1, further comprising:
sending a state query message to the vehicle, wherein the state query message includes a request for the vehicle data; and
in response to a predetermined time period elapsing before receiving a response to the state query message, retrieving object sensor data of any of the external objects located within the predetermined area.

7. The method of claim 1, further comprising:
determining a velocity of the vehicle based on the vehicle data; and
in response to determining that the vehicle is in an immobile state based on the velocity of the vehicle, determining that the issue type is an immobility issue of the vehicle, wherein the indication of the issue type includes the immobility issue.

8. The method of claim 1, wherein the vehicle data is based on vehicle sensor data of at least one sensor in the vehicle and further comprising:
determining an occupant state value based on the vehicle sensor data; and
in response to the occupant state value satisfying an occupant state condition, generating an occupant state indication.

9. The method of claim 1, wherein the external data further comprises any of a vehicle velocity, velocities of the external objects, a vehicle orientation, orientations of the external objects, an autonomous mode state for the vehicle, a vehicle operational state, a vehicle energy state, traffic signal data, road closure data, construction data, road condition data, emergency vehicle route data, and zoning data.

10. A vehicle monitoring apparatus comprising:
a non-transitory memory; and
a processor configured to execute instructions stored in the non-transitory memory to:
receive vehicle data and external data associated with a vehicle and a corresponding predetermined area, wherein the vehicle data includes a vehicle state of a vehicle and the external data includes external states of external objects;
determine an issue type of the vehicle based on the vehicle state and at least one of the external states; and
generate an indication of the issue type for display on an interface.

11. The apparatus of claim 10, wherein the processor is further configured to execute instructions stored in the memory to:
generate route data based on location states and temporal states of the vehicle relative to expected location states and expected temporal states of the vehicle, wherein the issue type is based on the route data.

12. The apparatus of claim 11, wherein the processor is further configured to execute instructions stored in the memory to:
generate expected destinations of the vehicle based on the expected location states and the expected temporal states;
group the external objects into clusters according to the expected destinations;
determine cluster sizes of each of the clusters; and
generate a congestion indication of each cluster that has a cluster size exceeding a threshold cluster size.

13. The apparatus of claim 10, wherein the processor is further configured to execute instructions stored in the memory to:
generate traffic data based on any of a number and a location of the external objects; and
determine a traffic issue based on the traffic data, wherein the indication of the issue type includes the traffic issue.

14. The apparatus of claim 10, wherein the external data comprises any of vehicle velocity, velocities of the external objects, a vehicle orientation, orientations of the external objects, an autonomous mode state for the vehicle, a vehicle operational state, a vehicle energy state, traffic signal data, road closure data, construction data, road condition data, emergency vehicle route data, and zoning data.

15. The apparatus of claim 10, wherein the processor is further configured to execute instructions stored in the memory to:
sending a state query message to the vehicle, wherein the state query message includes a request for the vehicle data; and
in response to a predetermined time period elapsing before receiving a response to the state query message, retrieving object sensor data of any of the external objects located within the predetermined area.

16. A non-transitory computer-readable storage medium including program instructions executable by one or more processors that, when executed, cause the one or more processors to perform operations, the operations comprising:
receiving vehicle data and external data associated with a vehicle and a corresponding predetermined area, wherein the vehicle data includes a vehicle state of a vehicle and the external data includes an external states of external objects;
determining an issue type of the vehicle based on the vehicle state and at least one of the external states; and
generating an indication of the issue type for display on an interface.

17. The non-transitory computer-readable storage medium of claim 16, the operations further comprising:
generating route data based on location states and temporal states of the vehicle relative to expected location states and expected temporal states of the vehicle, wherein the issue type is based on the route data.

18. The non-transitory computer-readable storage medium of claim 17, the operations further comprising:
generating expected destinations of the vehicle based on the expected location states and the expected temporal states;
grouping the external objects into clusters according to the expected destinations;
determining cluster sizes of each of the clusters; and
generating a congestion indication of each cluster that has a cluster size exceeding a threshold cluster size.

19. The non-transitory computer-readable storage medium of claim 16, the operations further comprising:
generate traffic data based on any of a number and a location of the external objects; and
determine a traffic issue based on the traffic data, wherein the indication of the issue type includes the traffic issue.

20. The non-transitory computer-readable storage medium of claim 16, wherein the external data comprises any of vehicle velocity, velocities of the external objects, a vehicle orientation, orientations of the external objects, an autonomous mode state for the vehicle, a vehicle operational state, a vehicle energy state, traffic signal data, road closure data, construction data, road condition data, emergency vehicle route data, and zoning data.

* * * * *